July 5, 1938. W. G. DUDLESTON 2,122,739
APPARATUS FOR COATING AND SLATING ROOFING SHINGLES
Original Filed May 11, 1932 14 Sheets-Sheet 1
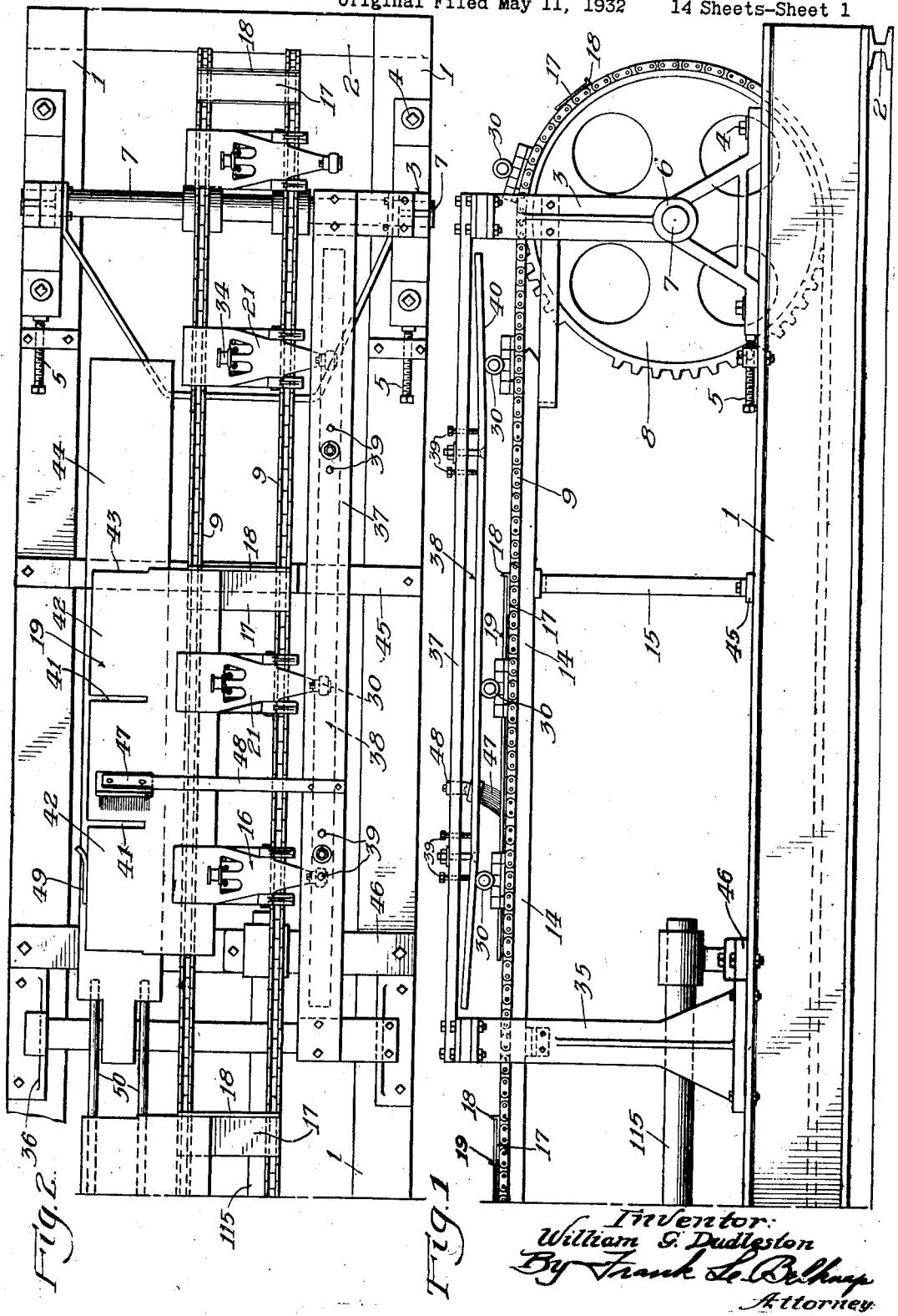
Inventor:
William G. Dudleston
By Frank L. Belknap
Attorney July 5, 1938.  W. G. DUDLESTON  2,122,739
APPARATUS FOR COATING AND SLATING ROOFING SHINGLES
Original Filed May 11, 1932  14 Sheets-Sheet 2
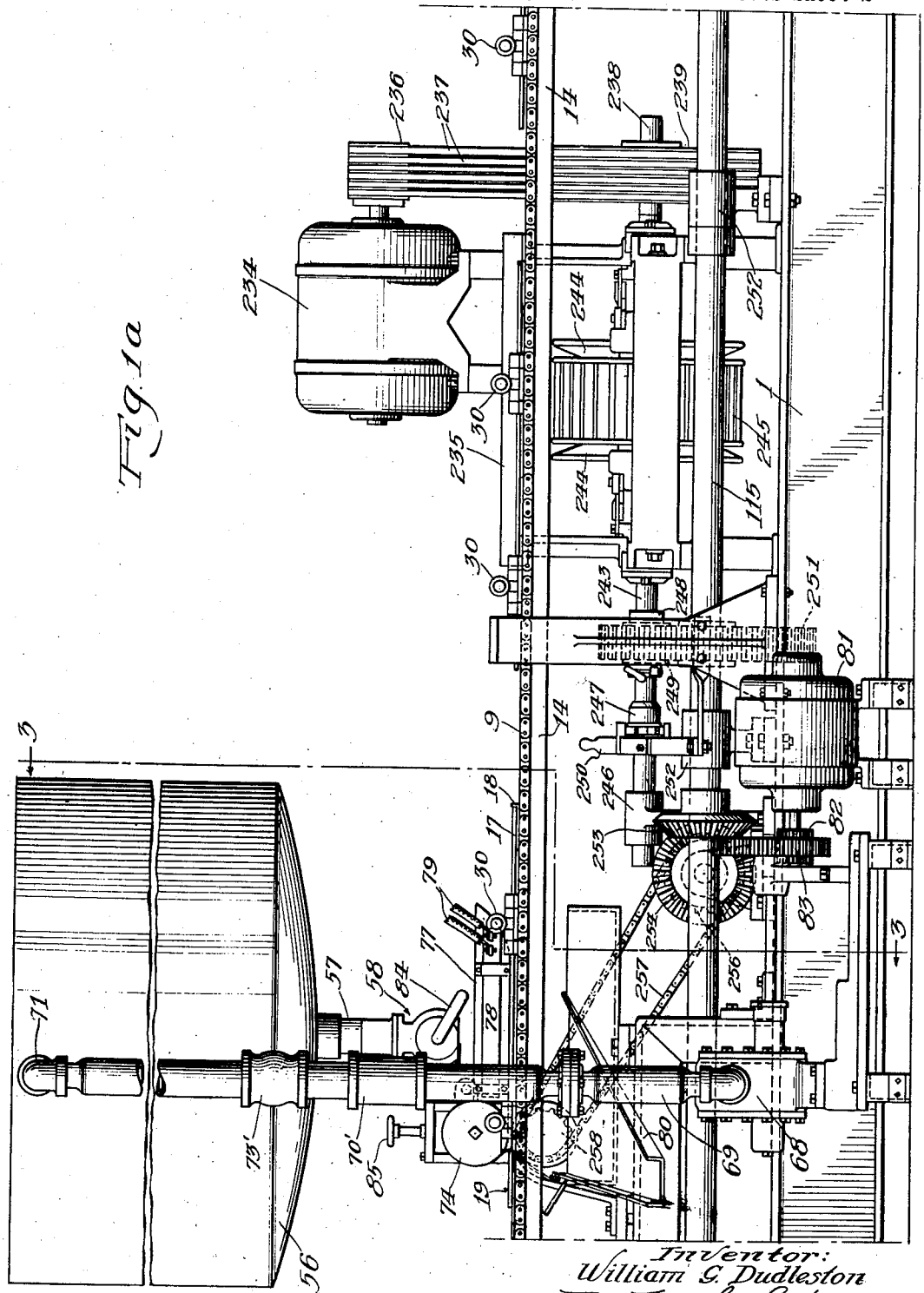
Inventor:
William G. Dudleston
By Frank L. Belknap
Attorney

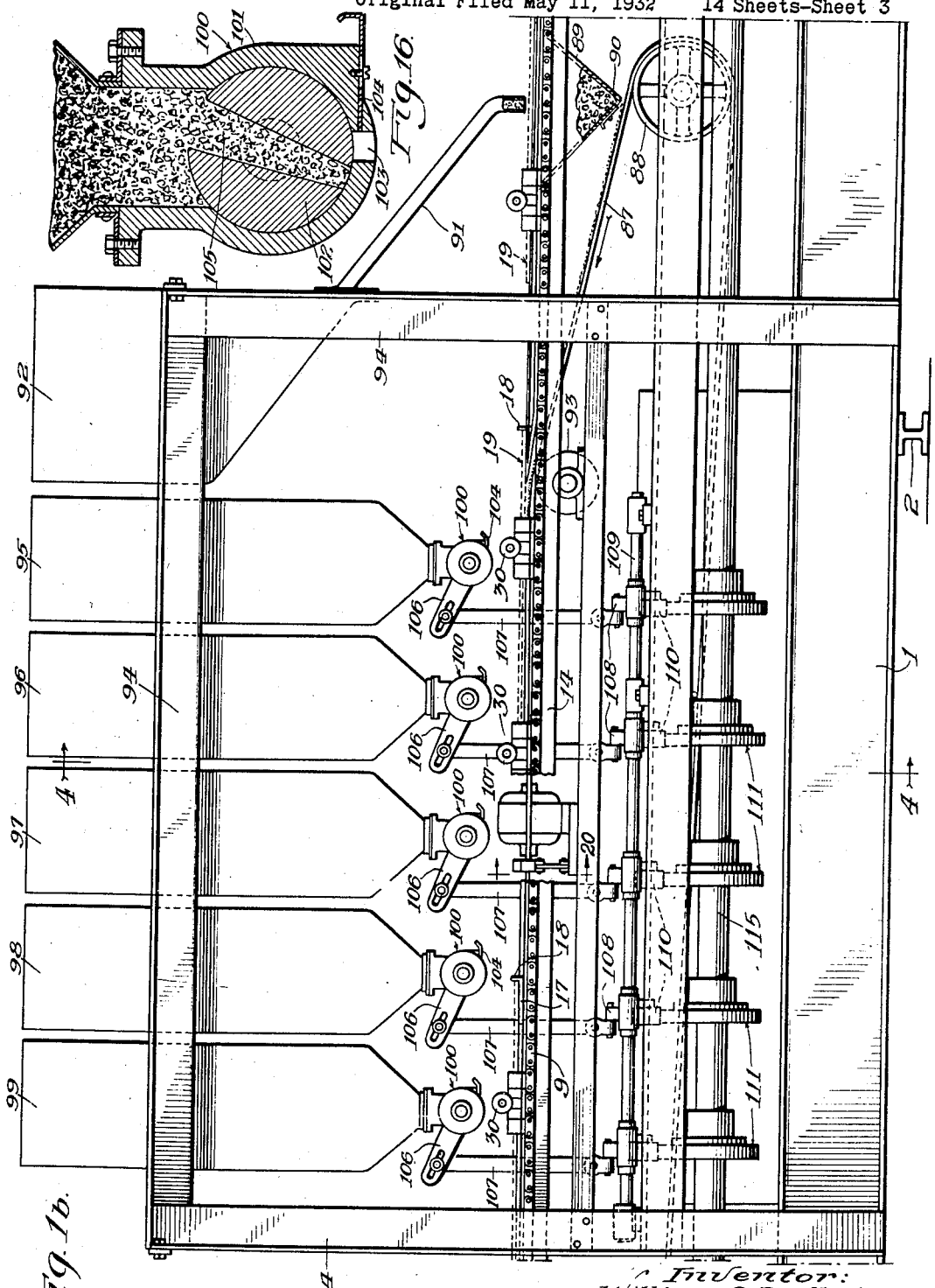

July 5, 1938.  W. G. DUDLESTON  2,122,739
APPARATUS FOR COATING AND SLATING ROOFING SHINGLES
Original Filed May 11, 1932  14 Sheets-Sheet 4
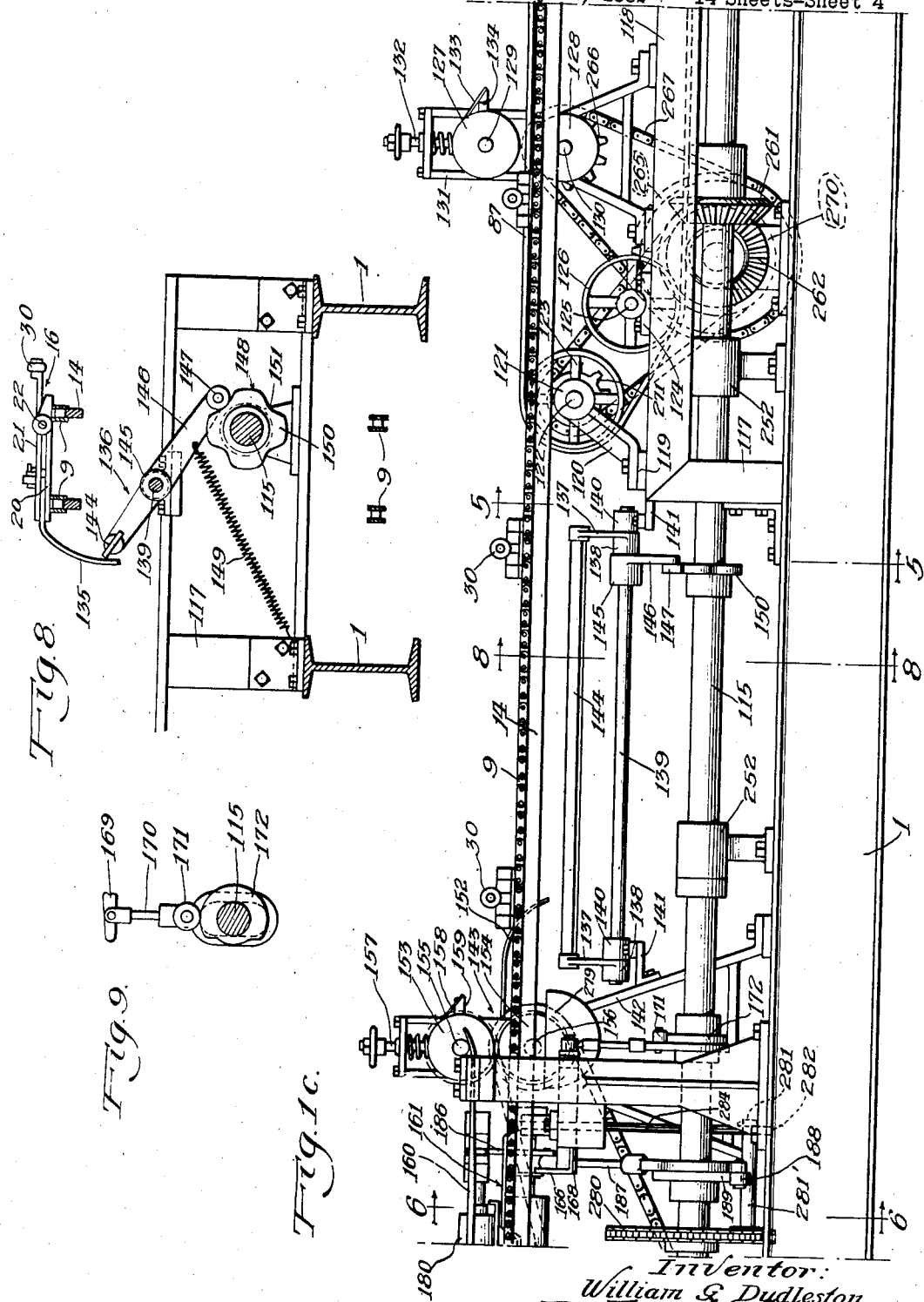

July 5, 1938.  W. G. DUDLESTON  2,122,739
APPARATUS FOR COATING AND SLATING ROOFING SHINGLES
Original Filed May 11, 1932   14 Sheets-Sheet 5
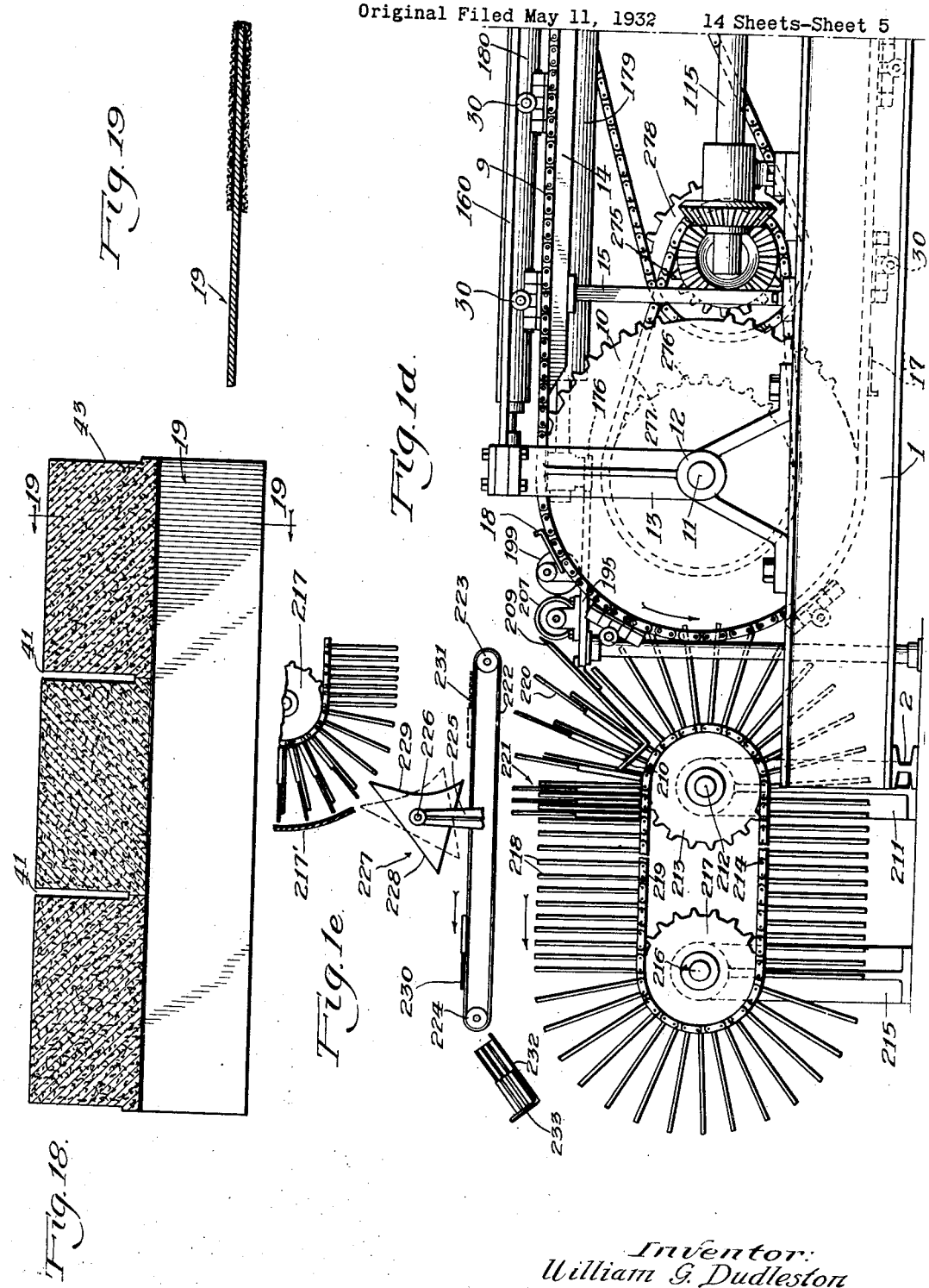
Inventor:
William G. Dudleston
By Frank L. Belknap
Attorney.

July 5, 1938. W. G. DUDLESTON 2,122,739
APPARATUS FOR COATING AND SLATING ROOFING SHINGLES
Original Filed May 11, 1932   14 Sheets-Sheet 6
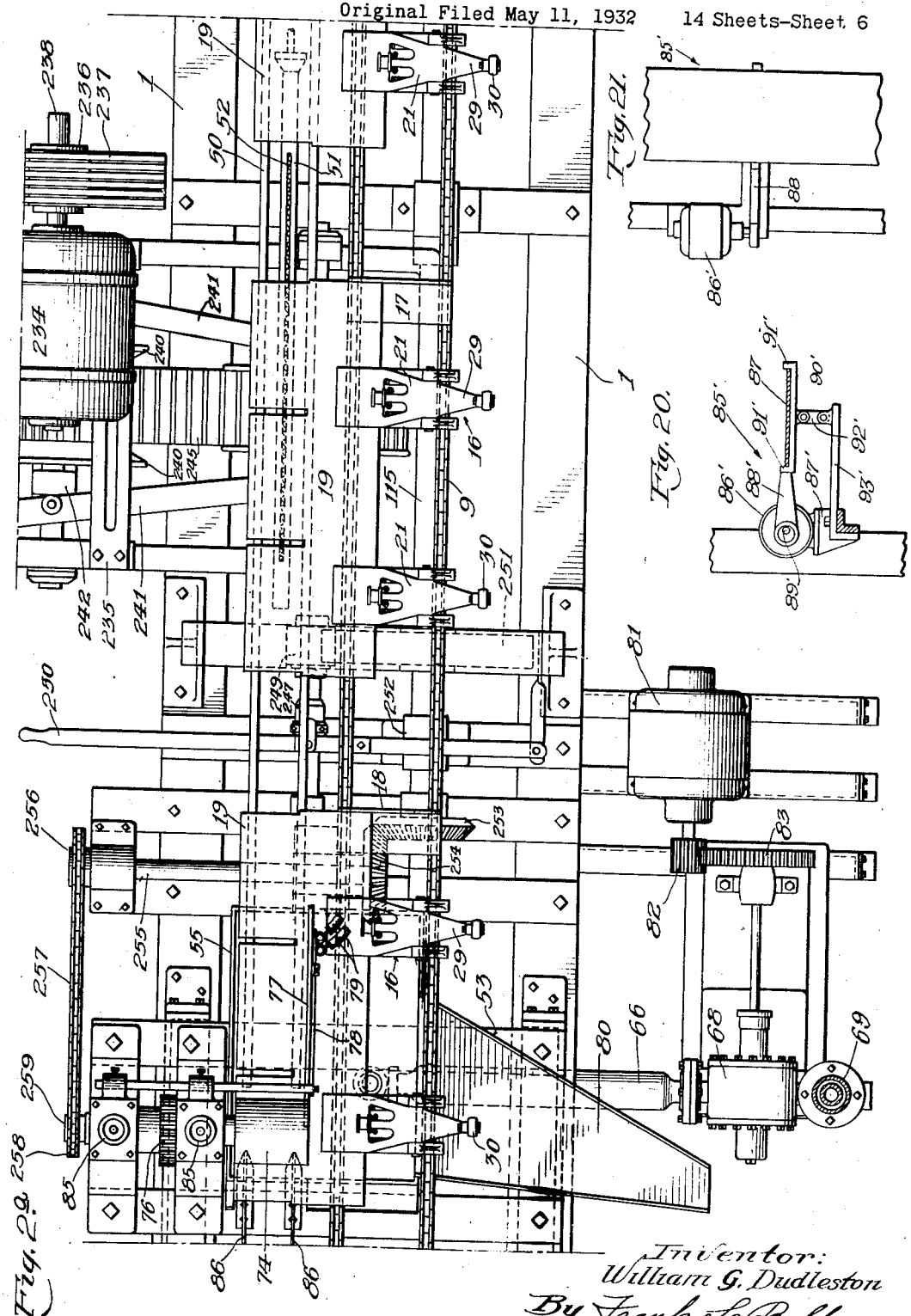
Inventor:
William G. Dudleston
By Frank L. Belknap
Attorney July 5, 1938.  W. G. DUDLESTON  2,122,739
APPARATUS FOR COATING AND SLATING ROOFING SHINGLES
Original Filed May 11, 1932  14 Sheets-Sheet 7
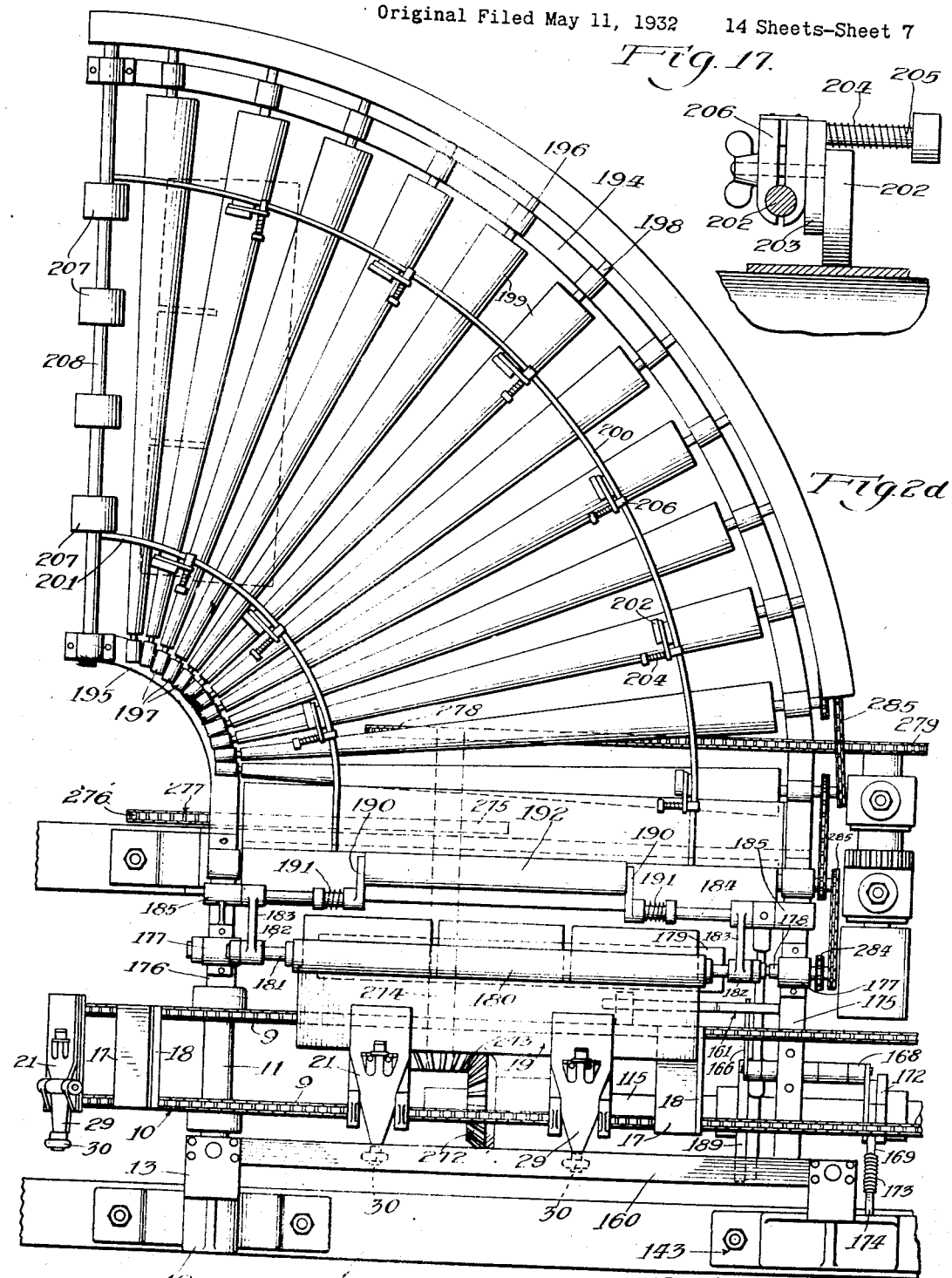
Inventor:
William G. Dudleston
By Frank L. Belknap
Attorney

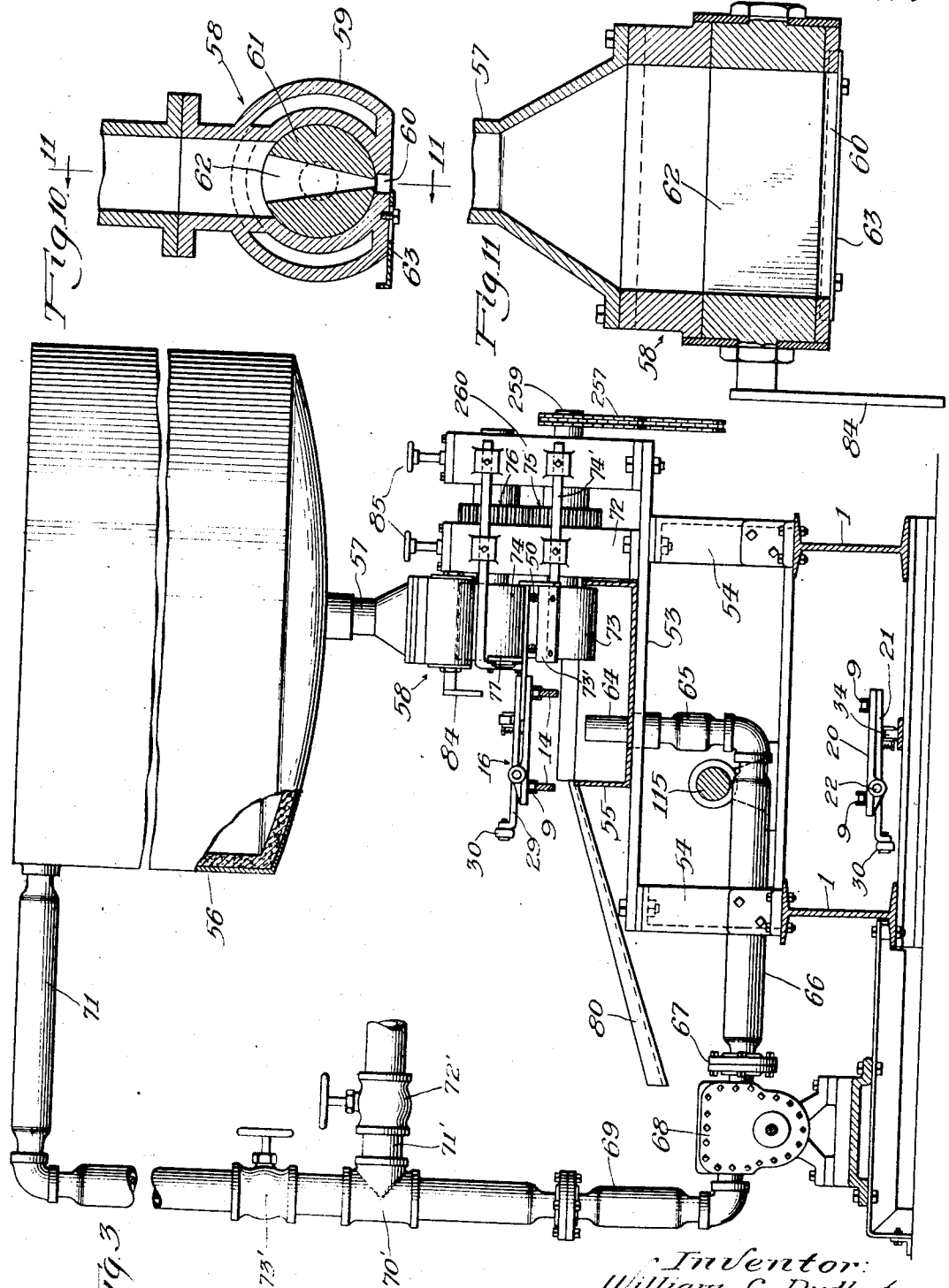

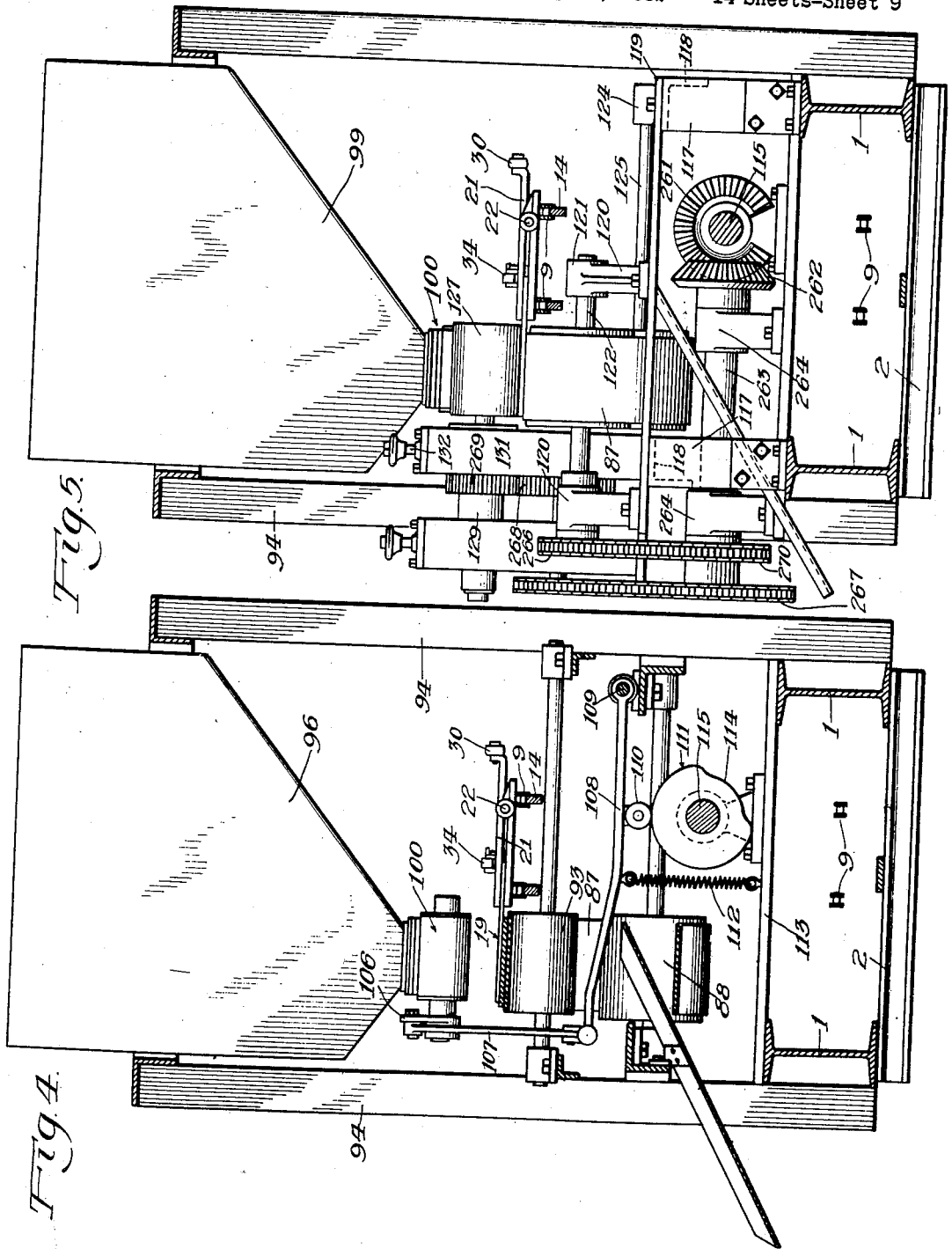

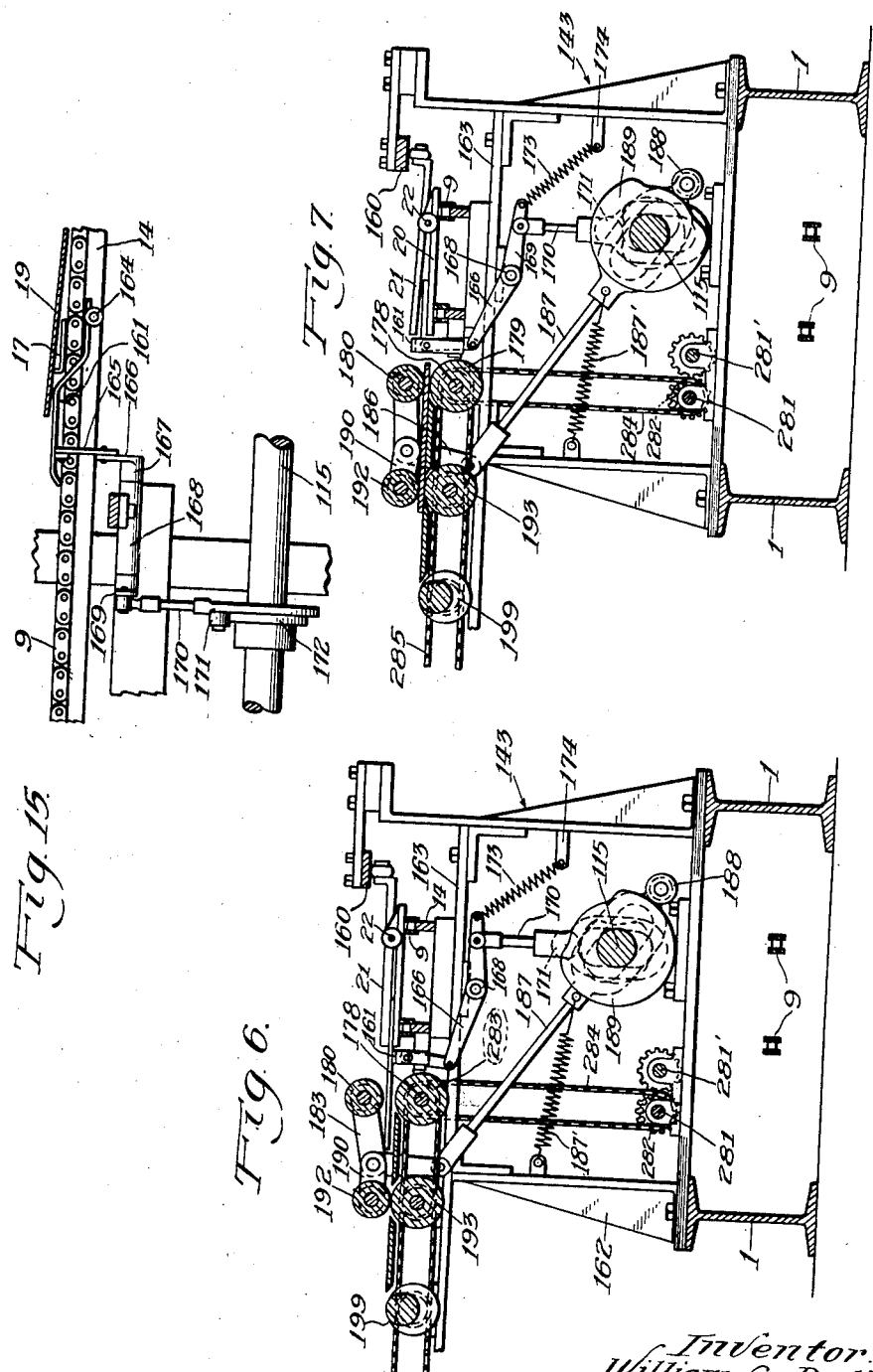

July 5, 1938.  W. G. DUDLESTON  2,122,739
APPARATUS FOR COATING AND SLATING ROOFING SHINGLES
Original Filed May 11, 1932    14 Sheets-Sheet 11
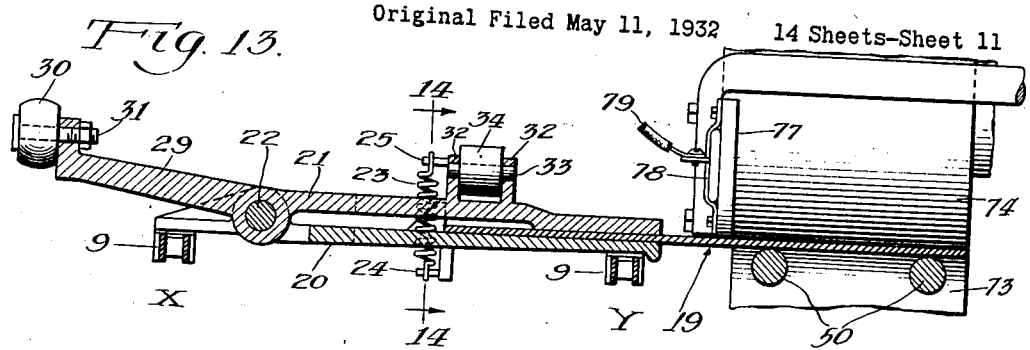
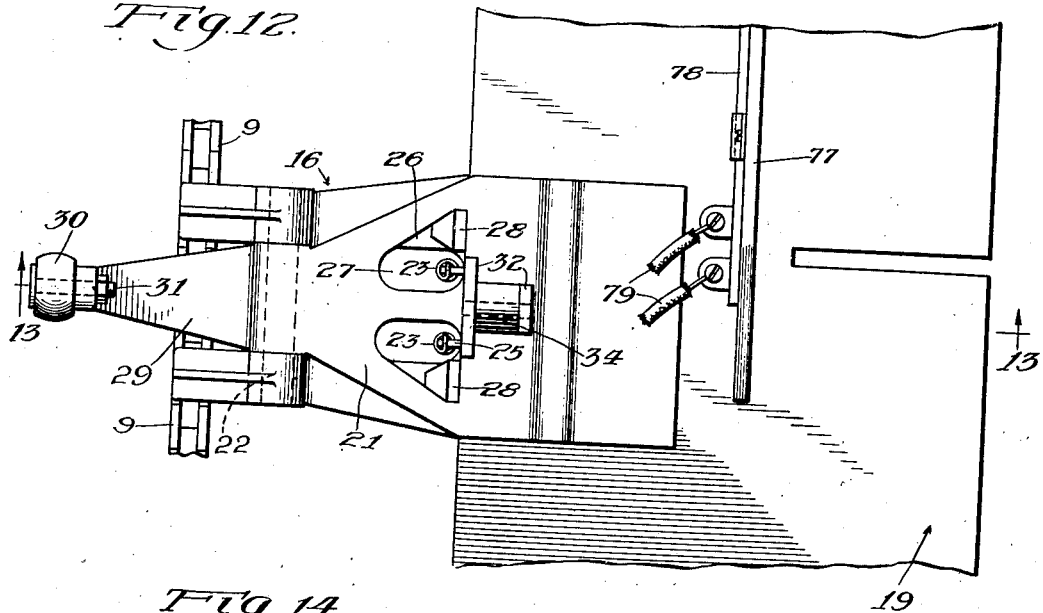
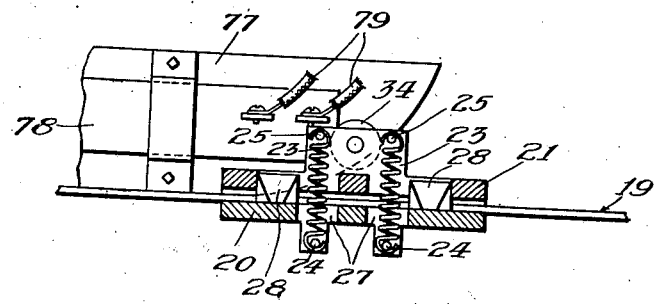
Inventor:
William G. Dudleston
By Frank L. Belknap
Attorney

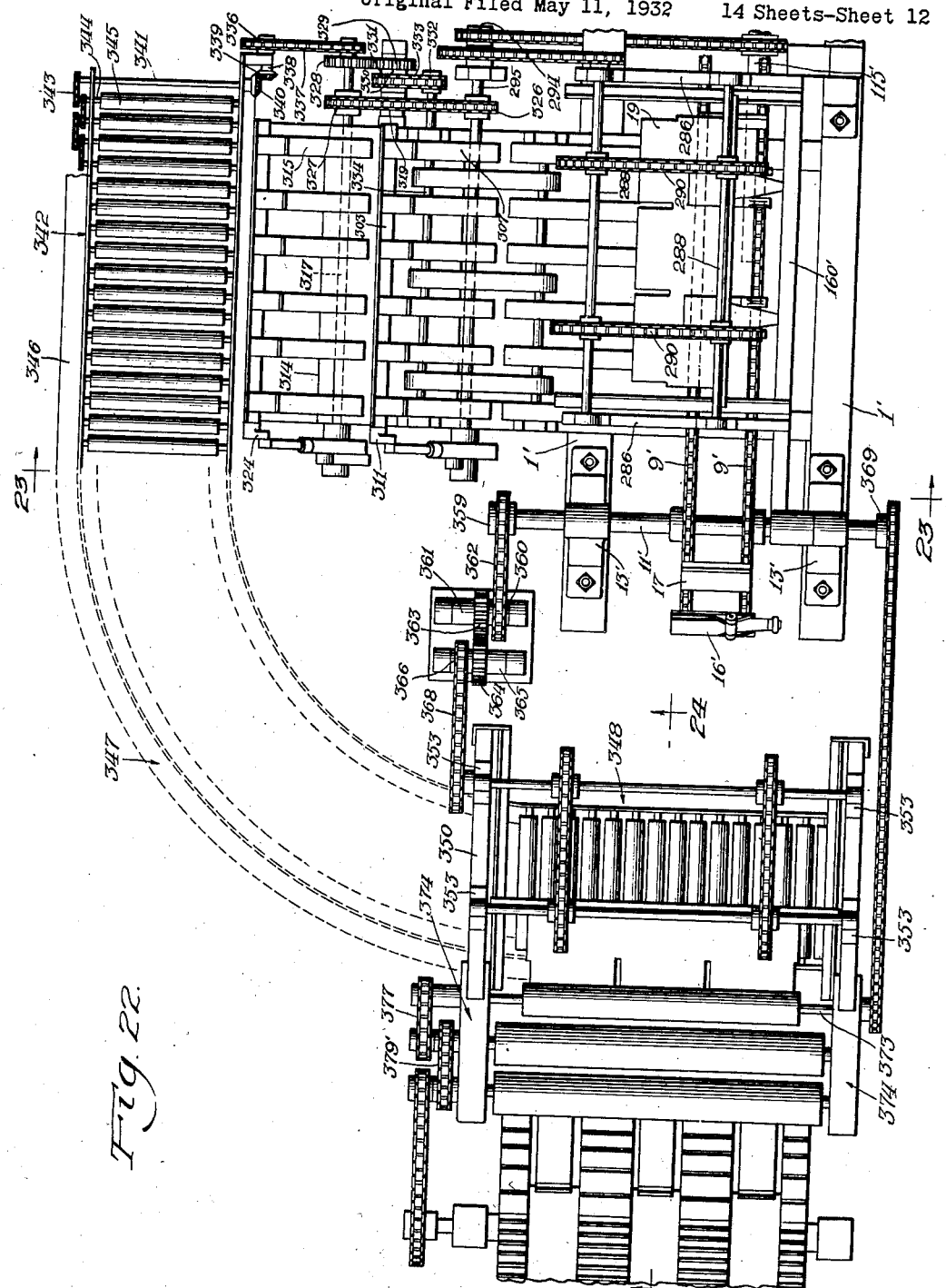

July 5, 1938.  W. G. DUDLESTON  2,122,739
PARATUS FOR COATING AND SLATING ROOFING SHINGLES
Original Filed May 11, 1932  14 Sheets-Sheet 13

Inventor:
William G. Dudleston
By Frank L. Belknap
Attorney.

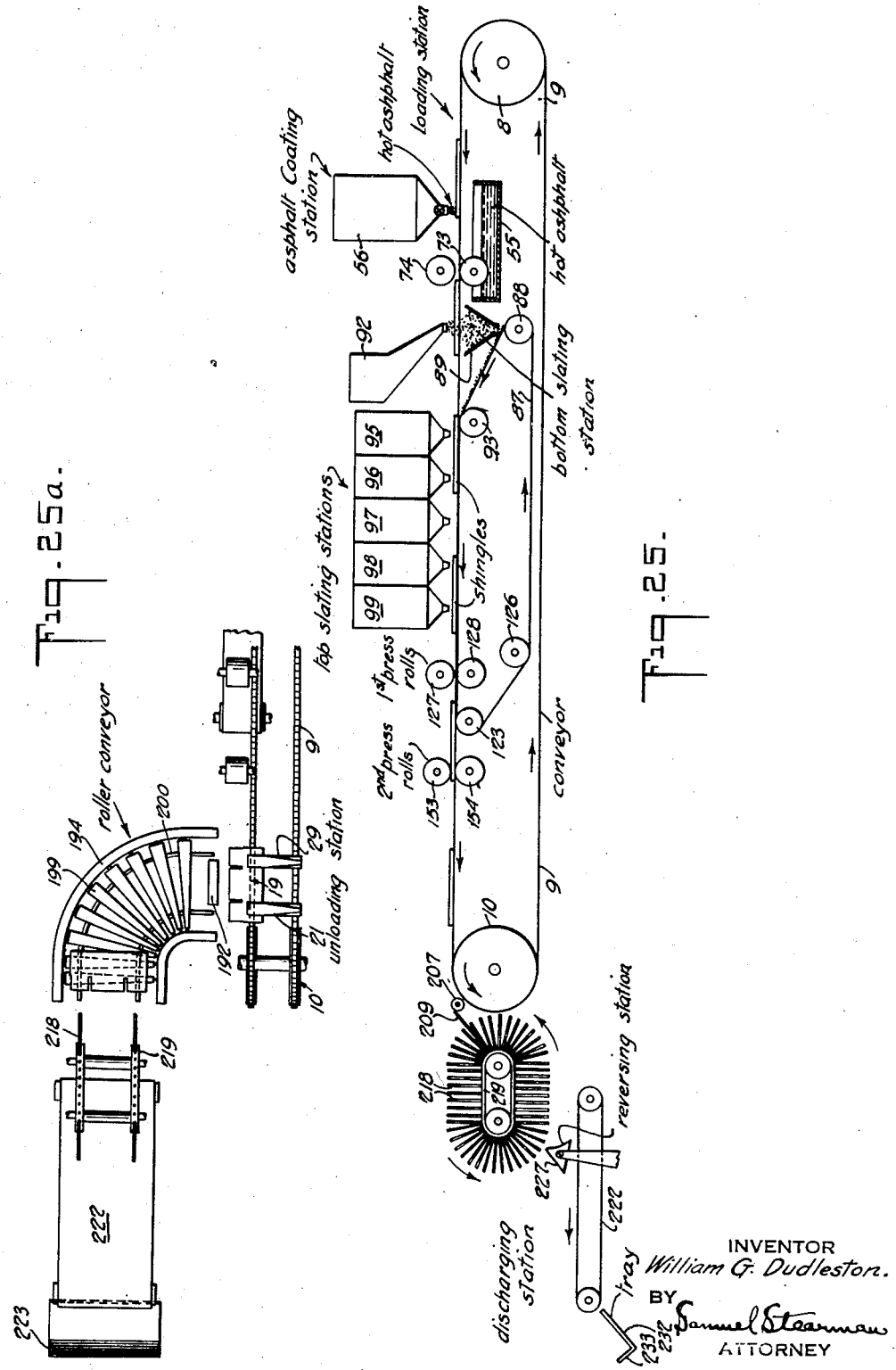

Patented July 5, 1938

2,122,739

UNITED STATES PATENT OFFICE 2,122,739

APPARATUS FOR COATING AND SLATING ROOFING SHINGLES

William G. Dudleston, Chicago Heights, Ill., assignor to The Patent and Licensing Corporation, New York, N. Y., a corporation of Massachusetts Original application May 11, 1932, Serial No. 610,624. Divided and this application July 24, 1935, Serial No. 32,898. Renewed December 3, 1937

8 Claims. (Cl. 91—43)

This application is a division of my co-pending application Serial No. 610,624, filed May 11, 1932.

This invention relates to improvements in a method and apparatus for coating, slating, cooling and stacking roofing shingles as a continuous operation and refers specifically to a method and apparatus for coating and slating predetermined portions of both faces of roofing shingles while said shingles are continuously carried forwardly with their surfaces disposed in a substantially horizontal plane and their longitudinal edges are maintained parallel to the path of their forward movement.

The present invention is ideally adapted to the manufacture of thick butt shingles wherein the shingle blank is provided with a waterproofing envelope coating all exposed edges and opposite faces of the shingle, the coating on the exposed face being applied substantially only to that portion to be exposed to weathering. It is unnecessary to go into detail as to the many advantages of thick butt shingles as they are well known in this art.

An important object of my invention resides in a method and means whereby both the upper and lower faces and adjacent edges of shingles may have uniformly and simultaneously applied thereto a waterproofing substance while the shingles are being carried forwardly with faces disposed substantially horizontal and their longitudinal edges are maintained parallel to the path of their forward movement.

Another important object of my invention comprises a method and apparatus whereby slate, mica, sand and/or any other desired granular material or a material such as talc or the like, may be applied to the coated portions of the shingles while said shingles are being carried forwardly.

A further important object of my invention comprises a method and means whereby the most efficient ratio of coating to granular material for weathering purposes may be established and maintained throughout the entire period of operation.

It is another object to apply the waterproofing material as a preformed film or ribbon of desired thickness and uniform width whereby to secure a coating of uniform thickness and width from edge to edge of the shingle.

If multi-tab strip shingles are operated upon, desired portions of both surfaces and edges adjacent to those portions may be coated with a waterproofing material and granular or powdered material may be applied to the coated portions as desired. For instance, granular material may be applied to one face of each of the coated shingles whereas the opposite faces may be coated with powdered material, or granular materials of the same or different character may be applied to either or both faces of the coated portions of the shingle. If desired, differently colored granular material may be applied to the individual tabs and the arrangement may be such that the individual tabs of the strip shingles following each other in sequence may be so colored as to produce strip shingles the tabs of which have varied color combinations. Thus, in stacking said shingles, adjacent shingles in said stack may be of different color combination. This feature of my invention may also be applied to unit shingles, in which case adjacent unit shingles of the stack may be provided with granular surfaces of different colors.

In the following detail description my invention is illustrated as being applied to and utilized with a multi-tab strip shingle. It is to be understood, of course, that I do not wish to be limited to the coating of this type of shingle, since unit shingles of a wood, fibre, or felt base as well as multi-tab shingles may be coated, slated, cooled and stacked in accordance with my invention, as well as continuous webs adapted to be subsequently severed into smaller units.

My invention, briefly described, comprises passing shingle strips or the like forwardly to a conveyor whereby the strips are carried in seriatim in a direction parallel to their longitudinal edges and with their faces disposed in a substantially horizontal plane. If desired, during an initial period of travel of the shingles, portions of each of the shingles may be heated to drive moisture therefrom and make the same more receptive for the coating material subsequently to be applied. The heating may take place while the shingles are being carried by the conveyor. At a subsequent period of travel of the shingles predetermined portions of the shingles, usually those portions of the shingles which when used are exposed to weathering, are coated with films of coating material, heated asphalt, for instance. The coating may be applied to the edges, and to portions of either or both faces of the shingle. The shingles carried forwardly by the conveyor may receive on one or both coated faces a quantity of granular material of desired color or combinations of colors. At a subsequent period of travel the granules may be partially embedded in the coating by pressure and the excess granular material may be removed, the removed excess being retrieved and reused. Thereafter that portion of the shingle carrying the coating and partially embedded granules may be smoothed. During all of the foregoing operations the shingles are moving continuously upon the conveyor. After the smoothing operation the shingles may be removed in seriatim from the conveyor and carried to a second conveyor wherein the shingles may be deposited edgewise in spaced relation with respect to each other. The shingle may thus be carried a predetermined distance at a predetermined speed to permit cooling and substantial setting of the coating and as a final operation the shingles may be stacked with their coated edges alternately facing in opposite directions. The shingles are then ready for packing and shipping.

Other important objects and advantages of my invention will be apparent from the accompanying drawings and following detail description.

In the drawings, Fig. 1 is a side elevational view of the feed end of a machine suitable for carrying out my invention.

Fig. 1a is a similar view showing a continuation of the machine.

Fig. 1b is a view similar to those shown in Figs. 1 and 1a illustrating particularly the slate hoppers.

Fig. 1c is an elevational view being a continuation of the device as shown in Figs. 1a and 1b.

Fig. 1d is a side elevational view of the delivery end of the machine.

Fig. 1e is a diagrammatic side elevational view of the shingle strip stacking mechanism.

Fig. 2 is a top plan view of that portion of the device shown in Fig. 1.

Fig. 2a is a top plan view of the device as shown in Fig. 1a.

Fig. 2d is a top plan view of a portion of the device as shown in Fig. 1d.

Fig. 3 is a sectional view taken on the line 3—3 of Fig. 1a.

Fig. 4 is a sectional view taken on the line 4—4 of Fig. 1b.

Fig. 5 is a sectional view taken on the line 5—5 of Fig. 1c.

Fig. 6 is a sectional view taken on the line 6—6 of Fig. 1c.

Fig. 7 is a view similar to that shown in Fig. 6 illustrating particularly a different position of the shingle ejecting mechanism.

Fig. 8 is a sectional view taken on the line 8—8 of Fig. 1c illustrating particularly the vibrating mechanism.

Fig. 9 is a detail view of the shingle ejecting cam.

Fig. 10 is a transverse sectional view illustrating particularly the asphalt valve construction.

Fig. 11 is a sectional view taken on the line 11—11 of Fig. 10.

Fig. 12 is a top plan view illustrating particularly a shingle gripping member.

Fig. 13 is a sectional view taken on the line 13—13 of Fig. 12.

Fig. 14 is a transverse sectional view taken on the line 14—14 of Fig. 13.

Fig. 15 is a detail view of the shingle ejecting mechanism.

Fig. 16 is a sectional view illustrating particularly the construction of one of the slate valves.

Fig. 17 is a detail view illustrating one of the conveyor clamp rollers utilized in conjunction with the device shown in Fig. 2d.

Fig. 18 is a top plan view of the product of my invention illustrating particularly the coated and slated tabs.

Fig. 19 is a sectional view taken on the line 19—19 of Fig. 18.

Fig. 20 is a fragmentary sectional view taken on the line 20—20 of Fig. 1b.

Fig. 21 is a fragmentary top plan view of the device shown in Fig. 20.

Fig. 22 is a top plan view of a modified form of delivery apparatus.

Fig. 25 is a diagrammatic side elevational view of a complete machine embodying one form of the invention with the several parts thereof designated by legends; and Fig. 25a is a diagrammatic partial plan view of the machine shown in Fig. 25.

Figure 23:
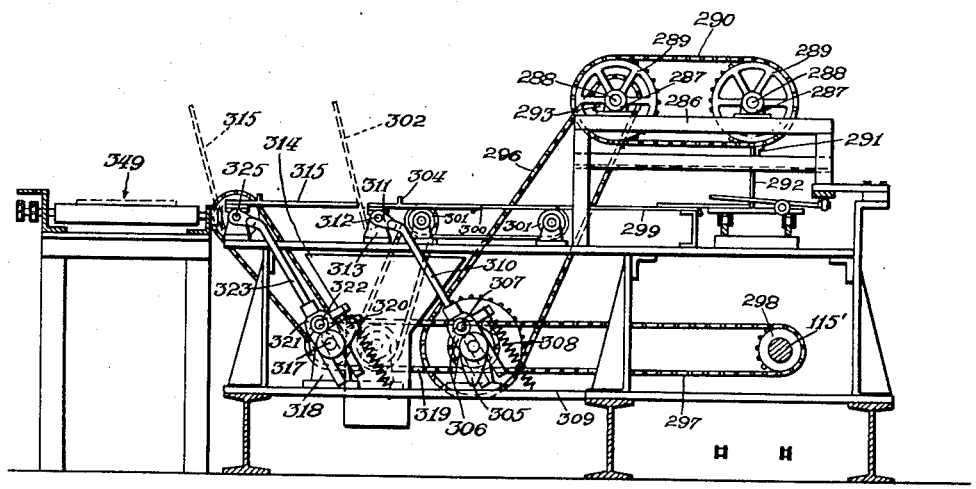
Fig. 23 is a sectional view taken on the line 23—23 of Fig. 22.

Referring in detail to the drawings and particularly to Figs. 1, 2 and 1d, 1—1 indicates a pair of I-beams which may serve as the supporting means for the machine proper. The beams 1 are mounted upon transversely disposed supporting beams 2 spaced at intervals along the length of the beams 1. The beams 1 are spaced parallel with respect to each other and traverse a substantial portion of the length of the machine.

A standard or support 3 may be mounted upon the upper flange of each of the beams 1, the arrangement being such that when the standards 3, normally retained upon the beams 1 by means of bolts or the like 4, are in approximate position, their exact position may be adjusted by means of set screws 5 and the standards may be brought into accurate transverse alignment with each other. Each of the standards 3 may carry a bearing 6 in which the respective ends of shaft 7 may be journalled. The shaft 7 may carry spaced sprocket wheels 8 over which sprocket chains 9 may pass. The chains 9 may traverse a substantial portion of the length of the machine and adjacent the opposite ends of the beams 1 said chains may pass over a similar pair of sprocket wheels 10 mounted upon shaft 11 which, in turn, is journalled in bearings 12 carried by standards 13. In traveling forwardly each of the chains 9 may be supported and ride upon the upper face of a track 14 supported at intervals along their lengths by supporting members 15. As will be hereinafter more fully described, the sprocket wheels 10 may be the driving elements whereas the sprocket wheels 8 may run idle.

The chains 9 may carry a plurality of gripping units each of which may comprise a plurality of grippers 16 and a plate 17 having an upwardly turned rear edge 18. As will be hereinafter more fully described, the chains 9 are used as conveyors and each gripping unit may be adapted to carry a tab cut shingle 19, the unslotted side of the shingle being held by the grippers 16 and the rear edge of the shingle being in contact with the flange 18.

Each of the grippers 16 may comprise a lower plate 20 and an upper plate 21 hinged together intermediate their lengths at 22. The jaws of the stripping member thus formed are normally maintained in contact with each other under the influence of coiled springs 23 which are retained at their ends upon lugs 24 and 25 respectively mounted upon the lower and upper plates 20 and 21. Both the upper and lower plates 21 and 20 respectively may be apertured as shown best at 26 and 27 in Fig. 12, the springs 23 being adapted to pass through said apertures. A pair of lugs 28 may be mounted upon the inner face of the lower plate 20 and may normally project through the apertures 26 in the upper plate and may serve as stops for the unslotted side of the shingle. The lower plate 20 may be mounted upon each of the chains 9, as shown at x and y in Fig. 13, and may transversely span said chains. The upper plate 21 may be provided with an outwardly extending arm 29 upon which may be mounted a roller 30 which may be freely rotatable about pin 31. A pair of lugs 32 may be mounted upon the upper face of the upper plate 21 and may carry a shaft 33 upon which may be mounted roller 34 the function of which is to ride upon a track provided adjacent the rearward travel of the chains 9, said track not being shown. A pair of standards 35 and 36 may be mounted upon the beams 1 at a position longitudinally spaced from the standards 3. The standard 35 in conjunction with the standard 3 upon the same side of the machine may carry a bar 37 which, in turn, may support a cam rail 38 adjustably positioned, by means of bolts 39, beneath the bar 37. The arrangement is such that upon traveling forwardly around the sprocket wheels 8, the grippers 16 substantially immediately upon the beginning of their horizontal travel pass adjacent the cam rail 38 and the rollers 30 are brought into contact with the inclined surface 40 of the cam rail. As can readily be seen the arm 29 which carries the roller 30 will be depressed and consequently the upper plate 21 of the gripper will be moved against the tension of the springs 23 from contact with the lower plate 20. In other words, the jaws of the gripper 16 are opened.

The shingle strip 19 which is adapted to be operated upon by my machine may be constructed of felt saturated with asphalt or other impregnating or waterproofing material and subsequently coated with a suitable surfacing material such as talc or the like, and a coating of relatively fine slate. The strips may be cut into desired lengths, and may, if desired, be provided with notches or slots 41 forming tabs 42 upon one longitudinal side of the strip. Opposite corners of the strip may be notched as shown best at 43 in Fig. 2 so that said strips when placed end to end bring the notches of adjacent strips together to form slots equivalent in dimensions to the slots 41. In laying shingle strips of this type, the strips are disposed in overlapping relationship and only the tabs 42 are visible and, hence, only said tabs are exposed to the weather. It has been found to be desirable that those portions of the strip which are exposed to weather be additionally coated with asphalt and slate in order to render them more resistant to weather conditions and present a relatively thick butt. Consequently, I have devised a method and means whereby a base shingle strip such as strips 19 may have tabs 42 and a portion above said tabs coated with asphalt and slate. As will be hereinafter more fully described not only the faces of the tabs 42 are coated but in addition the defining edges of said tabs are coated whereby moisture is prevented from entering the thickness of the tabs and causing the same to buckle, curl, and/or blister when exposed to the elements.

A platform 44 may be mounted upon the supporting members 45 and 46 which, in turn, may be mounted upon supports 15 and 35 respectively. The plane of the platform 44 may be such as to bring the upper face of said platform into coincidence with the upper face of the lower plates 20 of the grippers 16. As has been hereinbefore described, the chains 9 carrying the gripping units are adapted for continuous travel around the wheels 8 and 10. The gripping units, comprising the grippers 16 and plate 17, are each adapted to convey one shingle strip 19. The number of gripping units upon the chains 9 and the number of grippers comprising a gripping unit will be dependent upon the length of the shingle strip to be carried. For purposes of example the gripping units are illustrated as having two grippers 16 and a plate 17 and are adapted to convey shingle strips of approximately 36 inches in length. It is to be understood, of course, that the length of the shingle strip may be greater or less than 36 inches in which case a greater or lesser number of grippers 16 may be used.

As the chains 9 travel past the platform 44, shingle strips 19 may be inserted between the plates or jaws of the grippers 16 which, at this period of travel, are opened by the cam rail 38. The shingle strips 19 may be inserted manually or may be fed between the plates 20 and 21 of the grippers 16 by conventional automatic means connected in synchronized relation with the movement of the chains. Of course, if an automatic feed is to be used the same must be timed with the movement of the chains 9 in order that the shingle strips 19 will be fed to the gripping units when the gripping jaws are open. The shingle strips 19 when inserted between the open jaws of the grippers 16 are so positioned between said jaws that the unslotted longitudinal edge of the strip shingle is brought into contact with the stops 28 carried by the lower jaws 20 and the rear edge of the shingle strip is brought into contact with the flange 18 of the plate 17. It can readily be seen that as soon as the moving flange 18 contacts the rear edge of the shingle strip said strip will be carried along with the chains 9.

In order to insure the proper positioning of the shingle strip 19 within the grippers 16 before said grippers close, the movement of the shingle strip may be opposed by the frictional resistance, upon the upper surface of the strip, of a retarding means such as brush 47 carried by the arm 48 which, in turn, may be mounted upon the bar 37. In this manner the rear end of the shingle strip 19 is squared against the flange 18. A guide 49 may be mounted upon the platform 44 adjacent the path of travel of the shingle strip 19 and may be so positioned upon said platform as to displace the shingle strip 19 inwardly toward the grippers 16, and in this manner the longitudinal edge of the shingle strip will be brought into squared relationship with the stops 28. As soon as the chains 9 have traveled a distance sufficient to permit the rollers 30 to break contact with the cam rail 38, the jaws of the grippers close upon the unslotted side of the shingle strip 19 and securely hold said strip properly positioned between the grippers and properly squared with respect to the flange 18.

The shingle strips 19 now being carried forwardly by the chains 9 are supported along their unslotted side by the grippers 16. The tabs 42 are supported by and are adapted to slide upon a plurality of rods 50 which may run parallel to the direction of the travel of the chains. As has been hereinbefore mentioned it is intended to coat both faces of the tabs 42 and a portion above these tabs with an asphaltic substance, or the like, and as will be hereinafter more fully described, said substance, if of an asphaltic nature, during the coating operation is maintained at a relatively high temperature in order to retain the same in substantially liquid condition. In order to facilitate the subsequent coating operation it may be desirable that the coated portion be preheated. Consequently, during the movement of the shingle strips to the coating device, the tabs may pass over a gas pipe 51 provided with apertures 52, said pipe being connected to a source of combustible gas, not shown. The gas passing out of the apertures 52 and the pipe 51 may be ignited and in this manner the tabs 42 may be raised to a desired temperature.

It is to be understood, however, that I do not wish to be limited to the particular means whereby the portions to be coated are preheated inasmuch as said tabs may be preheated by passing the same over a heated plate (not shown), or the faces of the portions to be coated may be exposed to a blast of relatively hot air, or may be preheated by any suitable means. In some instances, the preheating step may be omitted.

A platform 53 may be mounted immediately beneath the path of travel of the shingle strips and may be supported by members 54 which, in turn, may be mounted upon the upper flanges of the I-beams 1. A vat 55 may be mounted upon the platform 53 immediately beneath the path of travel of the shingle strip 19. A tank 56 may be disposed immediately above the path of travel of the shingle strip and also above the vat 55. The tank 56 is adapted to contain a quantity of asphalt or other coating material and may be steam jacketed or may be heated by external means, (not shown) it being desirable that the asphalt be maintained in fluid condition. A steam jacketed pipe 57 may connect into the tank 56 at the bottom thereof and may terminate in asphalt distributing nozzle 58.

The nozzle 58 may comprise a steam jacketed housing 59 of substantially cylindrical shape. As a feature of the invention, the housing is provided with a relatively elongated aperture 60 at its lower portion through which the asphalt flows in the form of a relatively thin ribbon. A drum 61 may be rotatably positioned within the body 59 of the nozzle and may be provided with an aperture 62 of substantially V-shape cross section. It can readily be seen that when the axis of the V-shaped aperture coincides with the longitudinal axis of the elongated slot 60, asphalt will pass from the tank 56 through the aperture 60 in the form of a ribbon. A gate 63 may be slidably positioned upon the lower face of the nozzle 58 and may be adapted to change the effective cross section of the opening 60. In this manner the width of the stream and the amount of asphalt being discharged through the aperture 60 may be readily controlled. The nozzle 58 is so positioned with respect to the path of travel of the shingle strips 19 as to direct a stream of asphalt upon the tabs 42 in the form of a ribbon so as to secure a coating of uniform width and thickness from front edge to rear edge, it having been found that a round nozzle was not as satisfactory.

As another feature of my invention I contemplate discharging an excess quantity of asphalt from the tank 56 to the upper surfaces of the tabs 42 so that said excess in draining from the upper surfaces of said tabs passes over and coats the defining edges of the tabs. When the usual tab cut shingle strips are exposed to weather, it has been found that moisture enters the tabs through the defining edges thereof and consequently causes said tabs to buckle, curl and/or blister. Therefore, it is of importance to so seal these defining edges with asphalt as to make them impervious to moisture. Thus, by discharging an excess quantity of asphalt upon the upper surfaces of the tabs 42, the asphalt in draining passes over said defining edges and seals the same.

That portion of the asphalt which drains from the tabs 42 is caught by the vat 55. An outlet pipe 64 may extend upwardly from the bottom of the vat 55 and may be adapted to maintain a predetermined level of asphalt within said vat. The pipe 64 may be connected to the steam jacketed connection 65 which, in turn, joins the steam jacket pipe 66 being connected by means of coupling 67 to the steam jacketed pump 68. The discharge of said pump is connected by means of steam jacketed pipes 69, 70 and 71 to the tank 56 and, hence, that portion of the asphalt which passes through the pipe 64 is forced by means of pump 68 back to the bulk supply of asphalt within the tank 56.

A T coupling 70' may be interposed in pipe 70 and steam jacketed pipe 71' may connect into said coupling. A valve 72' may be interposed in pipe 71' and may be adapted to control the introduction of waterproofing material from a suitable source of supply, not shown. If desired, in the event of stoppage of the machine, the material within tank 56 may be drained therefrom to vat 55 and pumped from said vat through pipe 72' to the source of supply. In this event, valve 73' interposed in pipe 70 may be closed.

A frame 72 may be mounted upon the platform 53 adjacent the vat 55 and is adapted to serve as a support for rolls 73 and 74 which, if desired, may be geared together by means of spur gears 75 and 76. The lower roll 73 is so mounted with respect to the vat 55 that its periphery passes through the asphalt contained in said vat and, consequently, upon rotation of said lower roll a portion of said asphalt is carried as a film upon the surface of said roll. The rolls 73 and 74 are so mounted with respect to the asphalt nozzle 58 as to operate upon the tab portions 42 subsequent to the deposition of asphalt upon the upper surface of said tab portion. Previous to the passage of the tabs 42 between the rolls 73 and 74, the tabs 42 leave the supporting rods 50. Consequently, upon the passage of the tabs between said rolls, the lower surface of said tabs comes into contact with the periphery of the rotating lower roll 73 and a film of asphalt is applied to said lower surfaces.

The thickness of the film carried by the lower roll 73 and, hence, the thickness of the film applied to the lower surface of the tab portion of the shingle, may be controlled by an adjustably positioned doctor 73' positioned upon shaft 74' which, in turn, may be mounted upon the supports 72 and 260.

If desired the upper roll 74 may function merely as a scraper or doctor roll and in order to form a smooth surface of asphalt upon the upper surfaces of the tabs 42, it is preferable that said upper roll 74 is maintained stationary and merely serves to control the thickness of the film.

In order to prevent the asphalt discharging from the nozzle 58 from spreading and coating more of the upper surface of the shingle strip than is desired, and in order to confine the coating to the desired portion of said surface, a separating member or gauge 77 may be mounted adjacent the rolls 73 and 74 with the plane of its face parallel to the direction of travel of the shingle strips. As a feature of my invention, I may heat said separating member or gauge by means of an electrical heater 78 which may be connected to a source of electricity, not shown, by means of connections 79. In this manner the asphalt coming into contact with the separator 77 will not tend to solidify and consequently a clear line of demarcation between the coated and uncoated portion of the shingle will be formed.

It may be found desirable to apply external heat to the vat 55 in which case an electrical heating element or a plurality thereof, not shown, may be mounted upon the bottom of the vat 55. A tray or apron 80 may be mounted at one end upon the upper edge of the vat 55 and may, in the event of the drain pipe 64 becoming clogged or inoperative, conduct the excess asphalt within the vat 55 to a suitable receptacle, not shown.

The pump 68 which circulates the asphalt from the vat 55 to the tank 56 may be actuated by means of a motor 81 which may be geared by means of spur gears 82 and 83 to the pump 68. However, it is to be understood that the pump may be driven from the main drive of the machine or by any suitable prime mover.

The quantity of asphalt being discharged from the nozzle 58 in addition to being controlled by the member 63, may be controlled by the rotation of the drum 61 which may be operated by handle 84. The upper roll 74 may be moved towards or away from the lower roll 73 by actuating the control screw 85 and, hence, the thickness of the film of asphalt upon the upper surface of the shingle strip may be controlled.

As the chains 9 travel forwardly the coated tabs upon leaving the rolls 73 and 74 are supported upon wires 86 which are maintained under relatively high tension. It can readily be seen that inasmuch as the lower surfaces of said tabs carry films of relatively liquid asphalt, said tabs cannot be permitted to contact a flat surface. Consequently by the provision of the wires 86 the films upon the lower surfaces of the tabs are not materially disturbed during movement of the tabs along the wires.

If desired, the wires 86 may comprise material of relatively high electrical resistance and an electric current may be passed therethrough in order to heat the same. This may prevent an undesired formation of waterproofing material from accumulating upon the wires. It may be desired to supplant the wires 86 by heated pipes, for instance, steam pipes provided with relatively thin fins (not shown) over the heated edges of which the coated portions of the shingle may be carried. Another manner of supporting the coated shingle may comprise an endless mechanical conveyor belt (not shown) which may be positioned beneath the path of travel of the coated portion of the shingle and which may be provided with a plurality of upwardly projecting quills or pins upon the points of which the coated shingles may ride. Many other ways of supporting said coated shingles may suggest themselves to those skilled in the art and, hence, I do not wish to be limited to the precise structure shown and described.

Belt 87 may pass around pulley 88 mounted beneath the path of travel of the shingle strip, said belt being adapted to travel in the direction indicated by the arrow in Fig. 1b. A hopper 89 may be disposed immediately above the pulley 88 and has an opening 90 at its lower end, the hopper 89 being adapted to be filled with crushed slate or other surfacing material. The supply of slate may be replenished by means of the supply pipe 91 which may convey the slate from a main bulk supply container 92 to the hopper 89, said pipe discharging into said hopper at a point to the side of the path of travel of the shingle strip.

As the belt 87 travels over the pulley 88, a relatively thin film of granular slate is deposited upon the upper surface of the belt, the arrangement being such that during movement of the belt, slate will be removed from the hopper 89 whereas, when the belt remains stationary, no slate will discharge from the hopper. The belt then passes gradually upwardly at an angle sufficiently small so that the slate will not move upon the belt until said belt passes over pulley 93, journalled immediately beneath the path of travel of the tabs 42 of the shingle strips 19. In other words, the angle is less than the angle of slip for the material used. At this period of travel the tabs of the shingle strips carried by the gripping units come into contact and are supported upon their lower sides by the belt 87, the film of granular material being interposed between the upper surface of the belt and the lower surfaces of the tabs. Hence, said tabs will be prevented from adhering to the belt and at the same time inasmuch as the asphalt upon the lower surface of the belt at this period is relatively tacky, a quantity of the slate granules will adhere to the asphalt film.

To firmly embed the granules carried by the belt 87 in the film of waterproofing material upon the lower surfaces of the coated tabs, I may provide a belt vibrating mechanism, shown in detail in Figs. 20 and 21. The mechanism 85' may comprise motor 86' mounted upon platform 87' adjacent the path of travel of belt 87. An arm 88' may be eccentrically mounted upon the shaft 89' of motor 86' and may carry at its outer end plate 90' provided with flanged ends 91'. The belt 87 is adapted to travel over plate 90' between flanges 91' and said plate is supported beneath by the double pivoted link 92' which, in turn, may be mounted upon support 93'.

It can readily be seen that as belt 87 travels forwardly and motor 86' is energized, said belt may be vibrated transversely by plate 90' and the granules upon the surface of the belt may be worked into the film of waterproofing material upon the lower face of the tabs.

A frame 94 may be adapted to form a superstructure above the path of travel of the shingle strip and may be adapted to support a plurality of slate hoppers 95, 96, 97, 98 and 99, each of said hoppers being provided with a distributing valve 100 which may comprise a hollow body 101 within which drum 102 is adapted to rotate. The lower side of the body 101 may be provided with an elongated aperture 103 which may be controlled by member 104, slidably mounted upon the lower surface of said body. The drum 102 may be provided with an elongated V shaped sectioned aperture 105 which is adapted to serve as a connecting medium between the aperture 103 and the body of the hopper. Of course, it is to be understood that any number of slate hoppers may be utilized.

Upon forward travel of the chains 9, the shingle strip may be brought to such a position that the forward end of each of the tabs is positioned immediately beneath the aperture 103 of the valves 100 at the lower ends of the hoppers 97, 96 and 95. When such position is reached, the drums 102 of the valves which are connected to levers 106 may be actuated by links 107 which, in turn, are connected to levers 108 pivotally mounted at 109 upon the upright members of the frame 94. A roller 110 may be carried intermediate the length of the levers 108 and may be adapted to ride upon the surfaces of cams 111, said rollers being normally maintained in contact with said cams by means of springs 112 connected at their ends to the levers 108 and to frame members 113. As the flat portions 114 of the cams mounted upon shaft 115 come into contact with the rollers 110, levers 108 are depressed by means of springs 112 and the drums 102 are rotated so as to bring the axes of the slots 105 into coincidence with the axes of the apertures 103, and consequently slate 116 contained within the hoppers 97, 96 and 95, will be discharged through the apertures 103 onto the upper surfaces of the tabs 42, the discharge of the three hoppers taking place simultaneously as the forward edges of the tabs upon the shingle strip pass beneath the hoppers.

When the rear edges of each of the tabs of the shingle strip pass beneath the center line of the hoppers 97, 96 and 95, the raised portions of the cams 111 will come into contact with the rollers 110 and consequently levers 108 will be raised and drums 102 will be so rotated as to close the apertures 103.

As a feature of my invention the valves 100 are so designed as to permit instantaneous discharge of slate which is necessitated by the action of the cams 111 correlated as to speed with the movement of the shingle strips. By the provision of the V-sectioned apertures 105, immediately upon rotation of the drums 102 taking place and communication established between the apertures 105 and apertures 103, a stream of slate will be discharged from the valves 100, inasmuch as an available supply of slate is always maintained within the apertures 105 and no lag exists between the movement of the drums 102 and the discharge of the slate.

It can readily be seen that inasmuch as the slate is deposited upon each of the tabs from an independent source, my invention lends itself to the formation of shingle strips having multicolored tabs. For instance, it is possible to discharge a green tinted slate from the hopper 97, a blue tinted slate from the hopper 96, and a red tinted slate from the hopper 95. Consequently, the resulting shingle will have its first tab, taken in the direction of passage of the shingle, colored green whereas the second tab will be blue and the third tab red and due to the instantaneous operation of the valves 100, said tinted slate granules will not overlap due to sluggish operation of the valves 102.

Of course it is to be understood that the slate granules deposited upon the lower faces of the tabs 42 may be of one fixed color. It is also to be understood that the color schemes of the respective shingle strips may be varied and by provision of auxiliary hoppers 98 and 99 and the suitable cam mechanisms, various color combinations can be obtained, and various quantities of slate may be deposited during the continuous operation of the machine. In addition, it may be desirable to reverse the order in which the colors appear upon the tabs of a shingle strip, for instance, in the example stated above, hopper 97 contained green tinted granules, hopper 96 contained blue tinted granules, and hopper 95 contained red tinted granules. The shingle strip produced by utilizing these hoppers would appear when observed as having a green tinted tab, a blue tinted tab and a red tinted tab in the order named. If the order was desired to be reversed, the auxiliary hopper 99 may contain red-tinted granules and hopper 98 may contain blue tinted granules. In this event hoppers 96 and 95 may be rendered inoperative and the cams 111 may be so adjusted as to actuate the valves 100 when the shingle strip is beneath the hoppers 99, 98 and 97. A shingle produced by utilizing these three hoppers would present tabs having red, blue and green colors in the order named which, as can readily be seen, is just the opposite to those produced by the hoppers 97, 96 and 95.

If desired, six hoppers (not shown) similar to hoppers 95, 96, 97, 98 and 99 may be provided which may operate in units of threes, that is, three hoppers may be operated together. By this arrangement only one cam 111 may be provided and arms 106 of each of the hopper valves 100 may be linked together in units of three. When it is desired to operate one unit of three hoppers, the remaining three hopper valve arms may be disconnected and when the granule supply of the first operated units is exhausted, the second unit may be operated and the first unit disconnected.

It is to be understood, of course, that any number of hoppers may be utilized and any combination of granule colors may be deposited upon the coated portions of the shingles. If multi-tab shingles are operated upon, adjacent hoppers may discharge simultaneously or any predetermined hopper may discharge upon any predetermined tab. In this manner shingles may be produced having varied color combinations and a shingle receiving granular material may be of a color combination which may be different from that of the shingle immediately preceding and/or following. Of course, I do not wish to be limited by the above mentioned examples inasmuch as they are given merely to indicate the flexibility of operation of the device.

Referring particularly to Figs. 1c and 5, uprights 117 may be mounted upon the upper surfaces of each of the I-beams 1 and may be adapted to support angle irons 118 which may be disposed parallel to the I-beams 1. A bar 119 may be mounted at each of its ends upon the angle members 118 at opposite sides of the machine and may be adapted to carry supporting members 120 which, in turn, are provided with bearings 121 in which the ends of shaft 122 are journalled. The shaft 122 may carry pulley wheel 123 over which belt 87 may travel at its forward extremity. Bearings 124 may be mounted upon each of the angle irons 118 intermediate their length and may serve as journals of the shaft 125, which may carry pulley wheel 126. The belt 87 upon passing over the periphery of the pulley 123 may travel around a portion of the peripheral surface of the pulley 126, said latter pulley performing the double function of a guide pulley and a belt tightener. As will be clear to any one skilled in the art, the belt 87 may be tightened or loosened by sliding the bearings 124 forwardly or backwardly along the length of the angle iron 118. This slidable movement may be accommodated by means of slots, not shown, provided in the supporting plates of the bearings 124. The belt 87 upon passing over the surface of the pulley 126 returns to the pulley 88.

The belt 87 in passing from the pulley 93 to the pulley 123 is supported upon a platform, not shown, and is maintained in a plane parallel and substantially coincident with the plane of travel of the shingle strips 19 and as has been hereinbefore described while the belt supporting the tabs of the shingle strip passes beneath the hoppers 95, 96, 97, 98 and 99, a quantity of granular material is deposited upon the surfaces of the tabs. It is to be understood, of course, that in depositing the granular material upon the surfaces of the tabs, the said material merely flows upon said surfaces under the influence of gravity and consequently the granules rest evenly but more or less loosely upon the surface of the asphalt. The chains 9 in continuing their travel forwardly carry the shingle strip and belt 87 travelling at a linear speed equal to the linear speed of the chains carrying the tabs. If desired, however, the belt and chains may be run at a slight differential in speed. Prior to the passage of the belt over the pulley 123, both the belt and the supported tabs pass between press rolls 127 and 128, supported respectively on shafts 129 and 130. An upright support or standard 131 may carry bearings in which the shafts 129 and 130 are journalled, and by means of the screw 132 the normal pressure exerted by said rolls against each other may be adjusted. A knife 133 mounted upon arm 134 may have its edge disposed in contact with the surface of roll 127 and may be adapted to scrape all foreign material from said roll.

The granules carried by the tabs in passing between rolls 127 and 128 and being subjected to pressure, are embedded in the relatively soft asphalt coating which has been previously applied to the surfaces of the tabs. Similarly the granules carried by the belt 87 are pressed into the film of asphalt carried on the lower surfaces of the tabs. In this manner the granules will thoroughly cover both surfaces of the tabs to a predetermined thickness.

If different sized granules are used upon the upper and lower surfaces of the tabs, a screen (not shown) may be positioned adjacent pulley 123 so that the excess material upon belt 87 will be deposited upon said screen. The screen is adapted to separate the coarse granules from the fine material and in this manner said material may be redeposited in hopper 92.

When the chains 9 have passed forwardly beyond the pulley 123, the tabs thus far being supported by the belt 87 now being deprived of this support and being coated with the relatively heavy and relatively soft asphalt flex downwardly as shown best at 135 in Fig. 8. In so doing the excess granular material upon the surfaces of the tabs tends to fall from said surfaces and to facilitate the removal of said loose excess granules a vibrating element 136 is adapted to contact the rear faces of said tabs and shake the excess or loosely bonded granules from the surfaces of the tabs.

The vibrating member 136 may comprise a pair of arms 137 mounted upon sleeves 138, said sleeves being loosely positioned upon a shaft 139 which may be journalled at each of its ends in bearings 140 mounted upon lugs 141. The lug 141 at one end of the shaft 139 is positioned upon the upright member 117 whereas the opposite lug 141 is mounted upon one leg 142 of the standard 143 which will be hereinafter more fully described. A bar 144 is carried at each of its ends by the arms 137 and is adapted to contact the rear surfaces of the shingles in a manner which will be hereinafter described. A sleeve 145 may be rigidly connected to one of the sleeves 138, said former sleeve carrying arm 146. A roller 147 may be rotatably mounted upon the extremity of arm 146 and may be adapted to ride upon the surface of cam 148 which, in turn, may be rigidly mounted upon shaft 115. A spring 149 may be connected at one end to the arm 146 and may be anchored at the opposite end upon upright member 117, said spring being adapted to maintain the roller 147 in contact with the surface of the cam 148. The cam 148 may be provided with a plurality of lobes 150 and a corresponding plurality of interspersed depressions 151. It can readily be seen that as the shaft 115 rotates and also as the chains 9 travel forwardly, the arm 146 will be vibrated about the shaft 139 as a center and, consequently, the bar 144 will be correspondingly vibrated and will lightly tap the rear portion of the tabs 42 thereby tending to remove all loose or excess granular material from the faces of the tabs.

Of course, it is to be understood that my invention broadly contemplates other ways whereby the loose excess granular material may be removed from the coated portions of the tabs. For instance, the granules may be removed by a blast of air under pressure or by means of suction or vacuum.

The granular material shaken off or otherwise removed from the coated portions of the shingle may be collected and removed to the back slate hopper 92. If the rear surface of the coated portions of the shingles are to be sanded, the slate may be separately removed individually from the upper surfaces of the tabs and the colored slate removed to the respective slate hopper.

As the chains 9 travel forwardly the tabs 42, depending in the manner shown at 135 in Fig. 8, will be brought into contact with the rods 152 which guide the tabs back into a horizontal plane. The tabs then pass between press rolls 153 and 154 mounted respectively upon shafts 155 and 156, said shafts being journalled in vertically adjustable bearings carried by the standards 143, the adjustment of the shafts being controlled by the screw 157.

As has been hereinbefore described, the tabs subsequent to receiving the granular material upon their faces pass between the press rolls 127 and 128. However, at this period it is to be understood that a relatively slight excess of granular material is positioned both on the upper surfaces of the tabs and also upon the lower surfaces thereof. Consequently, the granules are embedded in the waterproofing substance and are disposed therein in a more or less haphazard manner and the surfaces thus formed are irregular and rough. Consequently, in passing between the rolls 153 and 154 the excess granular material having been removed, those granules which adhere to the asphalt coating are firmly embedded in said coating and the upper surfaces of the layer of granular material are brought into a plane. In other words, the granular coated faces of the tab are smoothed during the passage through the second press unit. A scraper 158 mounted upon arm 159 may be positioned upon the standard 143 and may be adapted to remove particles of granular and asphaltic material from the surface of the upper roll 153 thereby maintaining said surface clean and smooth.

After passing the second press unit the chains 9 are carried through the delivery end of the machine. A bar 160 may be mounted upon the standards 143 and 13 and may be disposed parallel and adjacent the path of travel of the chains. Said bar is slightly depressed at its central portion and functions with respect to the rollers 30 upon the upper plates 21 of the grippers 16, in a similar manner to the cam rail 38 at the forward end of the machine. In other words, the grippers carried by the chains 9 in passing along the length of the bar 160 are opened by the contact of the rollers 30 with the lower surface of the bar 160.

When both of the grippers 16 comprising the gripping unit have opened, a releasing member 161 positioned adjacent the path of travel of the lower surface of the shingle strip 19 raises and forces the rear end of the shingle strip upwardly a distance sufficient to permit the flange 18 of the plate 17 to pass therebeneath. In this manner it can readily be seen that the shingle strip is virtually disengaged from the gripping unit.

A standard 162 may be mounted transversely opposite from the standard 143 and is adapted to serve as a support for the bar 163 which passes transversely across the machine immediately beneath the plane of passage of the chains 9. The disengaging member 161 may be pivoted as shown at 164 in Fig. 15 upon the outer side of one of the tracks 14. The opposite end of said disengaging member may be pivotally connected to link 165, the end of said link being pivotally connected to arm 166 which, in turn, may be mounted upon shaft 167. Said shaft is journalled in the bearing 168 which is mounted upon the lower face of the bar 163 and an arm 169 is rigidly connected to the opposite end of said shaft. A link 170 is pivotally connected to the end of the arm 169 and the opposite end of said link carries the follower 171 which is adapted to ride upon cam 172 mounted upon shaft 115, said follower being maintained in contact with the cam periphery by means of spring 173 which may be anchored upon lug 174 mounted upon the standard 143.

Bars 175 and 176 may extend outwardly from the path of travel of the chains 9 in a transverse direction. Bearings 177 may be oppositely mounted upon said bars and may support shaft 178 which, in turn, may carry roll 179. As will be hereinafter more fully described, said roll during the operation of the machine, may rotate continuously and the longitudinal axes of said roll may be disposed adjacent and immediately beneath the path of travel of the tabs 42 of the shingle strips.

A roll 180 may be positioned immediately above the path of travel of the tab of the shingle strips and may be carried by shaft 181, the axis of which is substantially parallel to the axis of the shaft 178. The shaft 181 may be rotatably positioned at its end in bearings 182 carried by arms 183, said shaft being freely rotatable within said bearings. The arms 183 may be rigidly mounted upon shaft 184 which, in turn, may be journaled in bearings 185 mounted upon the supporting bars 175 and 176. An arm 186 may also be rigidly mounted upon shaft 184 and the arrangement is such that by swinging said arm said shaft may rotate and will also swing arms 183 carrying the roll 180. The end of arm 186 may be pivotally connected to the link 187 which, in turn, may carry at its opposite end the follower 188 which may ride upon the surface of cam 189 mounted upon shaft 115, said follower being normally maintained in contact with the surface of the cam by means of spring 187'.

The arrangement is such that simultaneously with the raising of the disengaging member 161 the follower 188 comes into contact with the cut away portion of the cam 189 thereby longitudinally shifting the link 187 which, in turn, swings arm 186 thereby swinging arm 183 downwardly and bringing the roll 180 into contact with the upper face of the shingle tabs. It can readily be seen that as soon as the roll 180 descends, said roll confines the shingle tabs between its own surface and that of the continuously rotating roll 179 and, hence, the shingle strips move at right angles to the direction of travel of the chains 9 thereby removing the unnotched portion of the shingle strip from between the open jaws of the grippers 16.

The shaft 184, in addition, carries arms 190 which may be resiliently mounted upon said shaft by springs 191. A roll 193 may be mounted immediately beneath the axis of the idler roll 192. However, roll 193 is a driven roll as will be hereinafter more fully described and also rotates continuously. The arrangement is such that normally the roll 192 is maintained in contact with the rotating roll 193 by means of the pressure of springs 191. Roll 192 is carried by arms 190 mounted upon shaft 184, and the normal position of the shaft 180 will be in its upraised position. When roll 180 descends said roll pinches the shingle between its periphery and the rotating roll 179 and passes the shingle between the spring pressed roll 192 and the roll 193. Hence, a transverse thrust is imparted to the shingle by the roll 193 and its passage is continued in a transverse direction with respect to the chains 9.

Arcuately disposed frames 194 and 195 may provide a continuation of the path of travel of the shingle strip at a direction at right angles to the direction of its removal from the gripping units. The members 194 and 195 carry bearings 196 and 197 respectively in which the shafts 197 and 198 may be journalled. Said latter shafts, as will be hereinafter more fully described, are driven and carry conically shaped rolls 199, the plane of the upper surface of said rolls being substantially the same as the plane of travel of the shingle strips between the rolls 192 and 193.

Arcuate shaped rods 200 and 201 may be positioned immediately above rolls 199 and may be adapted to carry rollers 202 journaled upon arms 203 which, in turn, are resiliently mounted by means of springs 204 and shaft 205 upon clamps 206, said clamps being positioned rigidly upon the members 200 and 201.

The arrangement is such that the shingle strip passing between rolls 192 and 193 is carried into contact with the first conical shaped roll 199 and by means of the rollers 202, said shingle strips are firmly maintained between the rollers 202 and the driven conical rolls 199. By this arrangement the movement of the shingle strip upon the surfaces of the rolls 199 is continued and said shingle strip is rotated through an angle of approximately 90° from its position when delivered from the gripping unit.

After leaving the last conical shaped roll 199, the shingle strip 19 passes over rollers 207 mounted upon shaft 208. Tray 209 may be positioned at one end adjacent the rollers 207 and may be inclined at an angle of approximately 45° to the horizontal. The lower edge of the tray 209 may terminate in a ledge or flange 210.

It can readily be seen that by this construction the shingle strip 19 passing over the rollers 207 will slide downwardly along the inclined surface of the tray 209 and will be retained by the flange 210, the tab portion of the shingle strip being positioned downwardly. A pair of standards 211 may be mounted adjacent the end of the machine proper and may be adapted to support shaft 212 upon which may be mounted a pair of sprocket wheels 213 over which sprocket chains 214 are adapted to travel. A pair of standards 215 may be spaced from the standards 211 and may be adapted to support shaft 216 upon which may be mounted sprocket wheels 217. It can readily be seen that the two chains 214 travel continuously around the sprocket wheels 213 and 217. A rod 218 may be mounted upon each of the links 219 of the sprocket chain, the arrangement being such that the axis of each of the rods upon each of the chains is disposed in a plane transverse to the direction of travel of the chains. The tray 209 and the flange 210 may be provided with a pair of slots formed transversely with respect to the width of the tray and flange 210, the arrangement being such that when the sprocket chains 214 are being carried around the sprocket wheels 213 and 217 the rods 218 carried by the links of the sprocket chains 214 will pass through the slots formed in the tray 209 and 210.

The arrangement is such that, after each shingle strip 19 is delivered to the surface of the tray 209, a pair of rods 218 carried by opposite links 219 pass through the slots formed in the tray and flange and remove the shingle strip from contact with the tray. This action is shown best at 220 in Fig. 1d. The motion of the chains 219 may be correlated with respect to the rate of delivery of shingle strips from the preceding mechanism so that one shingle strip 19 will be carried upon the upper surfaces of the chains 214 within compartments formed by the rods 218, as shown best at 221 in Fig. 1d. The purpose of this conveying mechanism is to permit the coated shingle strip to gradually cool and the length of travel of the chains 214, in other words, the distance between the shafts 212 and 216 will be dependent upon the amount of asphalt applied to the shingle strip, its melting point and temperature of application, the rate of travel of the machine proper and the rate of travel of the conveyor chains. Of course, the coated portions of the shingles must be cooled to a sufficient degree to permit packing otherwise said shingles would stick together.

Referring particularly to Fig. 1e, the discharge end of the conveyor chains is shown, that is, that portion of the travel of the chains where said chains pass over the sprocket wheels 217. A conveyor belt 222 may be adapted to travel immediately beneath the sprocket wheels 217, said belt passing around pulleys 223 and 224 and traveling in the direction shown by the arrows. A pair of standards 225 may be mounted beneath the path of travel of the ends of the rods 218 when the chains 214 pass around the sprocket wheels 217. The standards 225 may be adapted to support shaft 226 upon which may be mounted element 227. The element 227 is adapted to rock or oscillate backwardly and forwardly as shown in the full line and dotted line positions in Fig. 1e, said element being substantially prismatic in shape, one surface of which is flat, namely, the surface 228, whereas the adjacent surface is curved as shown at 229 in Fig. 1e. The apex formed by the juncture of the surfaces 228 and 229 is adapted to move adjacent the path of travel of the rods 218 upon the chains 214 as said chains pass around sprocket wheel 217 when said rods assume, what may be termed the critical angular position, that is, the position where the shingle strips carried by the rods tend to slip from said rods. In order to prevent premature slipping of the shingles, that is, before the rods 218 reach the critical position, a plate 217' may be disposed adjacent the path of travel of the outer ends of the rods 218 as the rods pass around the wheels 217. When the element 227 is in the position shown in full lines, the shingle strip carried by the rods at the critical position slide from the surfaces of said rods and is delivered to the inclined surface 228 over which said shingle strip slides and passes to the belt 222 with the uncoated portion of the shingle facing forwardly as shown best at 230 in Fig. 1e. The arrangement is such that the element 227 oscillates or rocks to the positions indicated by the full and dotted lined figures when adjacent rods 218 carried by the chains 214 reach the critical position. Consequently after one shingle strip has been delivered to the belt with the uncoated portion facing forwardly as shown at 230, the element 227 will rock to the dotted line position and the next adjacent pair of rods 218 carrying a shingle strip will deliver said strip into contact with the inclined curved surface 229. The shingle strip thus delivered will pass over the curved surface 229 and will slide to the upper surface of the belt 22 with the coated portion of the shingle facing forwardly, as shown best at 231 in Fig. 1e.

A tray 232 may be mounted adjacent the pulley 22 and may be provided with a ledge or flange 233. It can readily be seen that by alternately depositing the shingle strips upon the belt 222 in the manner indicated, the shingle strips will be delivered to the tray 232 with the tabs alternately upward and downward. Inasmuch as the coated tabs of the strips are relatively thicker than the uncoated portions of the shingle strip it is desirable to pack said tabs in an alternate manner so that a stable pile of shingles may be produced. Consequently, by delivering the shingle strips to the tray 232 in this alternate manner, the shingle strips accumulating upon the tray 232 may be removed therefrom and directly packed.

It can readily be seen that the distance which the shingle strip at 230 travels upon the belt 222 is much less than the distance that the strip at 231 travels upon said belt, hence, the surface speed of the belt 232 must be such that previous to depositing the shingle at 230, the shingle previously deposited at 231 must have been delivered to the tray 232. Consequently the belt 222 will run at a relatively high surface speed with respect to the movement of the conveyor chains 214.

The cooling mechanism shown in Fig. 1d and the stacking mechanism shown in Fig. 1e are indicated diagrammatically. However, it is believed that any one skilled in the art will be provided with sufficient information to properly construct said mechanisms.

It can readily be seen that the rate of speed of chains 214 must be timed with the passage of the chains 9 and the oscillating element 227 must be timed with the travel of the chains 214. However, this can be accomplished by driving the various mechanisms from the same prime mover and securing proper speed ratios by the selection of proper gearing.

The drive for the entire apparatus may comprise a motor or other suitable prime mover 234 which may be mounted upon a frame 235. The motor shaft may carry a pulley 236 over which a belt or plurality of belts 237 may pass. A shaft 238 may be journalled in the lower portion of the frame 235 and may carry pulley 239 over which belts 237 may pass. Two conical elements 240 may be slidably but non-rotatably mounted upon shaft 238, said elements being so disposed upon said shaft as to have their inclined surfaces facing each other. The elements 240 may be moved toward or away from each other by means of arms 241 connected at their ends to collars 242 which, in turn, abut against the elements 240. A shaft 243 may be journalled beneath the path of travel of the shingle strip and may carry conical elements 244 similar in construction to the elements 240. The elements 244 may be slidably but non-rotatably mounted upon the shaft 243 and may be moved toward or away from each other by means of the arms 241. A longitudinally flexible, transversely rigid belt 245 may pass over the inclined surfaces of the elements 240 and 244 and as can readily be seen the ratio of the speeds of the shafts 238 and 243 may be varied by rocking the arms 241 so as to vary the distance between the elements 240 and/or the elements 244. This type of drive is well known to the art and forms no part of the present invention, it being understood that any conventional speed changing drive may be utilized, or the mover may be directly connected to the main drive shaft 115 of the machine.

The shaft 243 may be journalled in bearing 246 and a slidable but non-rotatable collar 247 may be mounted upon said shaft intermediate its length. A collar 248 may be loosely mounted upon shaft 243 and may carry pinion 249. A lever 250 may be operatively connected to the collar 247 and may be adapted to engage said slidable collar with the collar 248 whereby the gear 249 may be rigidly connected to the shaft 243. It is to be understood, of course, that any suitable clutch mechanism may be substituted for the apparatus herein described, since the described clutch forms no part of the present invention. Gear 251 may be mounted upon shaft 115 and may be adapted to mesh with the pinion 249. The arrangement is such that when desired, by means of the clutch mechanism, the shaft 115 may be operatively connected to the prime mover 234.

The shaft 115 is positioned beneath the path of travel of the chains 9 and is suitably supported at intervals along its length by bearings 252. A bevel gear 253 may be mounted upon the shaft 115 and may be adapted to mesh with a cooperating bevel gear 254 mounted upon shaft 255 which may be disposed at right angles to the length of the shaft 115. A sprocket wheel 256 may be mounted upon shaft 255 and is connected by means of sprocket chain 257 to sprocket wheel 258 mounted upon shaft 259. The shaft 259 may be journalled in the support 260 and may carry roll 73 which is adapted to rotate within the asphalt vat 55. By this arrangement the lower asphalt roll 73 may be rotated. The gear 75 may also be mounted upon the shaft 259 and if desired may mesh with gear 76 and may be adapted to drive the upper asphalt roll 74. However, as has been hereinbefore described, it may be found desirable to maintain the upper asphalt roll 74 stationary in which case gears 75 and 76 may be adjusted to loosely ride upon their respective shafts.

As has been hereinbefore described, the cams 111 for operating the slate hopper levers 106 may also be positioned upon the main drive shaft 115 and the relative rate of rotation of the shaft 115 is such, if a 36 inch shingle strip is being coated, that for one revolution of the drive shaft 115 the chains carrying the shingle strip may travel approximately four feet which, in the case of a 36 inch shingle strip would represent the distance between the forward end of one strip and the forward end of the next succeeding strip. In this manner the cams 111 may be so designed as to open the hopper valves 100 at each revolution of the drive shaft 115 and at such time as to discharge the slate upon the tabs as said tabs pass beneath the hopper valves.

Referring particularly to Fig. 1c, a bevel gear 261 may be mounted upon the shaft 115 and may be adapted to mesh with bevel gear 262, mounted upon shaft 263 which may be journalled in bearings 264, said shaft being disposed at right angles to the length of the shaft 115. A sprocket wheel 265 may be mounted upon shaft 263 and may be adapted to drive sprocket wheel 266 by means of sprocket chain 267. The sprocket wheel 266 may be mounted upon shaft 130 upon which may also be mounted the roll 128. Gear 268 may also be mounted upon shaft 130 and may be adapted to mesh with gear 269 mounted immediately above gear 268 upon shaft 129 which may also carry roll 127. By this arrangement it can readily be seen that the rolls 128 and 127 may be driven from the main drive shaft 115 and their peripheral speeds may be suitably adjusted by means of the sprocket wheels 265 and 266 which may be constructed in any desirable sizes to produce the desired peripheral speeds.

A sprocket wheel 270 may also be mounted upon shaft 263 and may be adapted to drive sprocket wheel 271 mounted upon shaft 122 which carries pulley 123 over which belt 87 passes. The arrangement is such and the diameters of the sprocket wheels 270 and 271 are so calculated as to impart to the belt 87 a peripheral speed equal to the rate of passage of the chains 9. In other words, for a 36 inch shingle strip the ratio of the speed of the belt 87 and the rotation of shaft 115 will be similar to that of the travel of the chain with respect to the shaft, namely for one revolution of shaft 115 the belt 87 will travel approximately four feet.

Referring particularly to Figs. 1c, 6, 7, 8 and 15, it can readily be seen that cam 148 which operates the rocking or vibrating mechanism 136 is also mounted upon shaft 115. In addition, cams 172 and 189 for respectively operating the ejecting or lifting element 161 and for rocking the roll 180, are also mounted upon shaft 115, the latter two cams being adapted to operate once during each revolution which may correspond to the passage of one shingle strip.

A bevel gear 272 may be mounted upon shaft 115 and may be adapted to mesh with a cooperating bevel gear 273 mounted upon shaft 274 which may be disposed at right angles to the length of the shaft 115. A sprocket wheel 275 may also be mounted upon shaft 274 and is adapted to drive sprocket wheel 276 by means of sprocket chain 277, the sprocket wheel 276 being rigidly mounted upon shaft 11 upon which sprocket wheels 10 are mounted. As has been hereinbefore described, sprocket wheels 10 are the driving elements for the chains 9 and the peripheral speeds of the wheels 10, for a 36 inch shingle strip is such as to move chains 9 a distance of approximately four feet for each revolution of the shaft 115.

A sprocket wheel 278 may also be mounted upon shaft 274 and may be adapted to drive sprocket wheel 279 mounted upon shaft 156 upon which the lower press roll 154 is mounted. The press rolls 153 and 154 may be geared together by gears similar to those associated with the first press unit, namely, gears 268 and 269, and the peripheral speed of the rolls 153 and 154 is equal to the speed of the shingle strips.

It can readily be seen that the arrangement is such that the belt 87, the press rolls 127 and 128, press rolls 153 and 154 and the chains 9 are all correlated with regard to rate of travel with respect to the rate of rotation of the shaft 115, the peripheral speeds of the rolls and the rectilinear speed of the chains and shingle strip and belt being the same.

Shaft 115 may also carry sprocket wheel 280 which may be adapted to drive a corresponding sprocket wheel, not shown, upon shaft 281'. Shaft 281 and 281' may be geared together whereby motion from the shaft 115 is transmitted to shaft 281. A second sprocket wheel 282 may be mounted upon shaft 281 and may be adapted to drive sprocket wheel 283 by means of sprocket chain 284, sprocket wheel 283 being mounted upon shaft 178 which may also carry roll 179. Roll 179, 193 and the conical shaped rolls 199 may all be operatively connected to each other by means of sprocket chains 285. In this manner motion is imparted to said rolls which, in turn, serves to transfer the shingle strip from the coating machine proper to the cooling unit.

The drive for the cooling unit and stacking apparatus is not shown inasmuch as any one skilled in the art would clearly understand the operative mechanical connections which would enable said drive to be operated from either the shaft 115 or from any independent source of power.

It is to be understood, of course, that wherever the terms "tabs" or "tab portions" are used in the specification and claims with reference to coating, is meant those portions of the shingle which are coated and slated.

Figure 24:
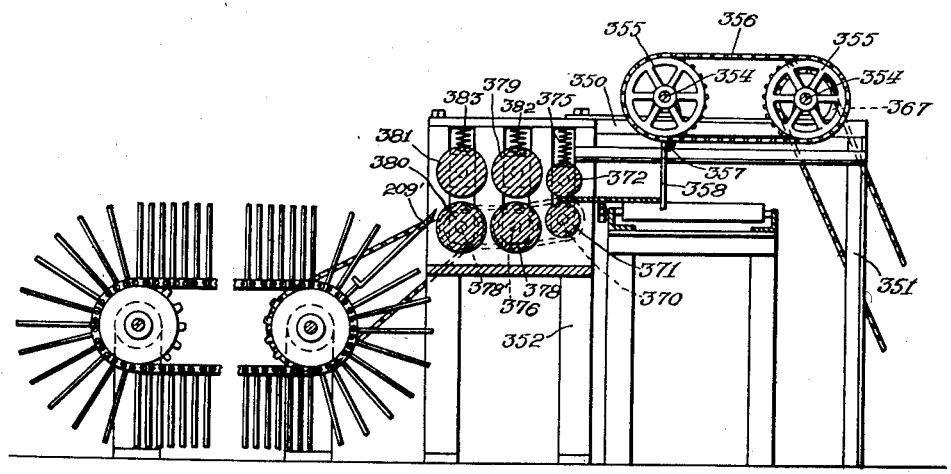
Fig. 24 is a sectional view taken on the line 24—24 of Fig. 22.

Referring particularly to Figs. 22, 23 and 24, a modified form of delivery apparatus is shown. This apparatus may be used in lieu of that shown in Figs. 1c, 1d, 6, 7, 8, 9, and 15. The reference numeral 1' may indicate spaced parallel beams corresponding to the beams 1. Standards 13' may be mounted upon beams 1' and may be adapted to support shaft 11' upon which may be mounted sprocket wheels, not shown, corresponding to sprocket wheels 10. Chains 9' may pass around said sprocket wheels and may be adapted to carry grippers 16' and plates 17' similar to grippers 16 and plates 17.

Beams 286 may be mounted above the chains 9' adjacent the point where said chains pass cam rail 160' corresponding to cam rail 160, and bearings 287 may be mounted upon said beams. Shafts 288 may be journalled in bearings 287 and may be adapted to carry sprocket wheels 289 over which sprocket chains 290 may pass. The chains 290 may carry a transversely positioned angle member 291 which, in turn, may carry a plurality of extending fingers 292. A sprocket wheel 293 may be mounted upon one of the shafts 288 and is adapted to be connected to sprocket wheel 294, mounted upon shaft 295, by means of sprocket chain 296. A shaft 295 is, in turn, driven by sprocket chain 297 which is adapted to travel around sprocket wheel 298 mounted upon shaft 115'.

The mechanism is so coordinated and timed that when grippers 16' mounted upon chains 9' and carrying shingle 19, reach the point in their travel when the grippers 16' are opened by the cam rail 160', chains 290 carrying fingers 292 will be so positioned as to contact one longitudinal side edge of the shingle 19' and move the same transversely with respect to the direction of travel of the chains 9'.

A platform 299 may be mounted adjacent the path of travel of the chains 9' and the upper surface thereof is disposed in substantially the same plane as the upper surface of the lower gripper plate. Consequently when chains 290 have so rotated as to cause contact between fingers 292 and the longitudinal side edge of shingle 19, said shingle will be thrust transversely on to platform 299.

As chains 290 continue their travel, the shingle 19 caused to move by fingers 292 is transferred from platform 299 to conveyor belts 300 which may be carried over pulleys 301. The shingle 19 carried upon said belts may then be transferred to arms 302 mounted at one end upon the angle member 303. The arms 302 may be so disposed with respect to each other as to include between adjacent arms one of the belts 300 and the angle member 303 may be provided with a longitudinally disposed upwardly extending flange 304 against which the notched longitudinal side of the shingle 19 may abut.

A cam 305 may be mounted upon shaft 295 and a bifurcated follower 306 may be disposed adjacent said cam, the arms of said follower being disposed on diametrically opposite sides of the shaft 295. The follower 306 may carry roller 307 which may normally ride upon the peripheral surface of cam 305, said roller being maintained in contact with said surface by means of spring 308 which may be anchored upon frame 309. The follower 306 may comprise one end of link 310, the opposite end of said link may be pivotally connected to arm 311 which, in turn, may be rigidly mounted upon shaft 312 journalled in bearings 313. The shaft 312 may, in turn, carry the angle member 303. Consequently, it can readily be seen that shaft 115' corresponding to the main drive shaft 115, upon rotating rotates shaft 295 at an equal angular velocity. The cam 305 mounted upon shaft 295 in contacting roller 307 carried by the follower 306, displaces link 310 thereby revolving arm 311 in a counterclockwise direction. In this manner shaft 312 is rotated and inasmuch as the arms 302 are mounted upon the angle member 303, said arms will be rotated in a counterclockwise direction. The arrangement is such that subsequent to the removal of the shingle strip 19 from the grippers 16' and after transference of said shingle strip by means of belts 300 to the arms 302, said arms are rotated in a counterclockwise direction thereby carrying the shingle therewith.

If it is desired to use this type of delivery mechanism, the vibrating device shown at 136 in Fig. 3 may be eliminated and means may be provided adjacent the path of travel of the chains 9 for supporting the tabs of the shingle strip 19 so that said tabs are maintained in a horizontal plane. In so supporting the tabs in a horizontal plane, the excess granular material carried upon the upper surface of said tabs is not removed and when said tabs pass between rolls 153 and 154, they are merely subjected to an additional pressing action with an excess of granular material present. However, after delivery of the shingle strip 19 from the grippers 16' and to arms 302, excess granular material still remains upon the upper surface of the tabs. Thus when the arms 302 are rotated as has been hereinbefore described, said excess granular material slides from the surface thereof and may be caught in hopper 314 which may be provided with a plurality of compartments for the reception of the colored granular material from each of the tabs. In this manner the excess granular material is retrieved and similarly colored granular material is deposited in each of the hoppers. These hoppers may subsequently be emptied into the appropriate hoppers 95, 96, 97, 98 or 99.

The cam 305 and the links 310 and 311 are so constructed as to revolve arms 302 through an angle slightly greater than 90° in order that the shingle 19 positioned upon said arms may be expelled therefrom and passed through an angle of 180°. The shingle strip 19 in being expelled from the arms 302 is caught by the arms 315 which, in turn, may be mounted at their ends upon angle member 316, the arms 315 and angle supporting member 316 being similar in construction to arms 302 and angle supporting member 303. A shaft 317 may be mounted in bearings 318 positioned upon the supporting frame 309, said shaft being rotated by means of sprocket chain 319 which, in turn, is actuated from the shaft 295, the arrangement being such that shaft 115', 295 and 317 revolve at an equal angular velocity. A cam 320 may be mounted upon shaft 317 and may be similar in construction to cam 305 positioned upon shaft 295. However, the eccentric portion of said cam lags the eccentric portion of cam 305 throughout a predetermined angular degree. A follower 321 may be positioned adjacent cam 320 and may be similar in construction to follower 306. Follower 321 carrying roller 322 may be adapted to ride upon the peripheral surface of cam 320. A link 323 may be mounted at one of its ends upon follower 321 and may be pivotally connected at its opposite end to arm 324 rigidly positioned upon shaft 325 which, in turn, may carry the angle member 316.

The arrangement is such that after rotation of the arms 302 in to the position shown in dotted lines Fig. 23, the shingle supported by said arms is deposited in inverted position upon arms 315. The lag of cam 320 behind the cam 305 may be such as to permit the transference of the shingle from arms 302 to arms 315 before the eccentric portion of cam 320 contacts roller 322.

The drive for the delivery mechanism may be taken from the main drive shaft 115', a sprocket wheel 298 mounted upon shaft 115', drives a sprocket chain 297 which, in turn, passes around and drives sprocket wheel 294 mounted upon shaft 295. A second sprocket wheel 326 may also be mounted upon shaft 295 and may be operatively connected with sprocket wheel 327 by means of sprocket chain 219, sprocket wheel 327 being mounted upon shaft 317. A spur gear 328 may also be mounted upon shaft 317 and may mesh with spur gear 329 mounted upon shaft 330. A sprocket wheel 331 may also be mounted upon shaft 330 and is adapted to drive sprocket wheel 332 by means of sprocket chain 333. The sprocket wheel 332 may be mounted upon shaft 334 upon which may be mounted a plurality of pulleys 301 over which belts 300 may travel. A sprocket wheel 335 may be mounted upon shaft 317 and is adapted to drive sprocket wheel 336 by means of sprocket chain 337. The sprocket wheel 336 may be mounted upon shaft 338 which, in turn, may carry bevel gear 339 which may mesh with a cooperating bevel gear 340. Bevel gear 340 may be mounted upon shaft 341 which may be journalled in frame 342 comprising the supporting means for a right angle conveyor. The shaft 341 may carry at its opposite end a sprocket wheel, not shown, which is operatively connected by means of sprocket chain 343 to shaft 344 which may also carry roller 345. The right angle conveyor may comprise a plurality of rollers 345 which may be driven by a series of chains 343, said conveyor comprising a straight portion 346, a curved portion 347 shown diagrammatically in Fig. 22, and a straight portion 348, the straight portions 346 and 348 being provided with cylindrical driven rollers 345 whereas the curved portion of said conveyor may be provided with driven conical rollers similar to the rollers 199.

The shingle strip 19 delivered to the arms 315 may be rotated by said arms, when the eccentric portion of cam 320 contacts roller 322, through an angle of 180°. The shingle strip is thus deposited upon the upper surfaces of the rollers 345 as shown at 349 in Fig. 23. Upon being positioned on the conveyor, said shingle strip is carried over the surfaces of the driven rolls of the conveyor until it has been carried through an angle of approximately 90°.

Spaced parallel beams 350 may be positioned above the straight portion 348 of the conveyor and may be supported by supporting members 351 and 352. Each beam 350 may carry a pair of bearings 353 in which shafts 354 may be journalled. Each shaft 354 may carry a pair of sprocket wheels 355 respectively connected together by sprocket chains 356. An angle member 357 may be transversely mounted upon chains 356 and is adapted to carry fingers 358 which extend outwardly from said angle member.

Shaft 11' may carry at one end sprocket wheel 359 which, in turn, may drive sprocket wheel 360 mounted upon shaft 361, by means of sprocket chain 362. A spur gear 363 may also be mounted upon shaft 361 and is adapted to mesh with spur gear 354 mounted upon shaft 365. Shaft 365 also carried sprocket wheel 366 which is adapted to drive sprocket wheel 367 by means of sprocket chain 368, sprocket wheel 367 being mounted upon one of the shafts 354. In this manner the movement of chains 356 may be timed by selecting gears 363 and 364 of proper diameters to make a complete circuit for the passage of each shingle and, consequently, when the shingle strip 19 has travelled to a point beneath the chains 356, fingers 358 will have revolved to the lowermost point in their path of travel and the ends of said fingers will contact the longitudinal side edge of the shingle strip and will thrust the same in a direction transversely with respect to the conveyor.

Shaft 11' may also carry sprocket wheel 369 which may be adapted to drive a sprocket wheel, not shown, mounted upon shaft 370. A roll 371 may be carried upon shaft 370 and may be positioned immediately beneath a cooperating roll 372 mounted upon shaft 373, the shafts 370 and 373 being journalled in the frame 374. The roll 372 may be normally impelled toward roll 371 by means of springs 375. Hence, when shingle 19 is moved transversely from the conveyor by the fingers 358, the longitudinal edge of said shingle may be inserted between rolls 371 and 372 and, consequently, said shingle is carried forwardly through said rolls.

Shaft 370 may carry at its opposite end a sprocket wheel, not shown, which is adapted to be operatively connected to a second sprocket wheel, not shown, mounted upon shaft 376 by means of sprocket chain 377. A roll 378 may be mounted upon shaft 376 and may be disposed immediately beneath a cooperating roll 379. A second sprocket wheel, not shown, may be mounted upon shaft 376 and may be adapted to drive a sprocket wheel, not shown, mounted upon shaft 378' by means of sprocket chain 379'. The shaft 378' may carry roll 380 which may be disposed immediately beneath a cooperating roll 381.

The rolls 378, 379, 380 and 381 may serve as smoothing rolls to smooth the granular material deposited upon the faces of the tabs of the shingle strip. In other words, when using this type of delivery mechanism, the smoothing operation instead of taking place between rolls 153 and 154 takes place between rolls 378, 379, 380 and 381. Rolls 379 and 381 may be normally impelled towards respectively rolls 378 and 380 by means of springs 382 and 383.

The shingle strip after passing between the smoothing rolls may be delivered to tray 209' which may be similar in construction to tray 209, said shingle being subsequently carried by a conveying mechanism similar to that shown in Fig. 1d. The subsequent operations may be similar to those shown in Fig. 1e and are believed to be clear to any one skilled in the art.

I claim as my invention:

1. An apparatus for coating and slating shingles comprising in combination, means for conveying shingles forwardly in seriatim with their surfaces in a horizontal plane and their longitudinal edges parallel to the movement of said conveying means, means for applying liquid coating to a predetermined portion of the upper and lower surfaces and adjacent edges of said shingles, comprising a valved discharge disposed above the path of travel of said shingles and communicating with a bulk supply of said coating, and a rotating roll disposed below the path of travel adapted to apply a film of said coating from a bulk supply to the lower surface of the shingles as they are moved along on said conveyor, means for applying surfacing material to said coated portions, means for removing said shingles from said conveyor and means for driving the parts in timed relation.

2. An apparatus for coating and slating shingles comprising in combination, means for conveying shingles forwardly in seriatim with their surfaces disposed in a horizontal plane and their longitudinal edges parallel to the movement of said conveying means, means for applying fluid coating to a predetermined portion of the upper surface and adjacent edges of said shingles, means for applying surfacing material to said coated portions comprising a hopper having an outlet disposed above the path of travel of the coated shingles, means for automatically opening said outlet when the coated shingles pass therebeneath, means for removing said shingles from said conveyor and means for driving said parts in timed relation.

3. An apparatus for coating and slating shingles comprising in combination, means for conveying shingles forwardly in seriatim with their surfaces disposed in a horizontal plane and their longitudinal edges parallel to the movement of said conveying means, means for applying fluid coating to a predetermined portion of the upper and lower surfaces and adjacent edges of said shingles, means for applying surfacing material to said coated upper surface comprising a hopper having an outlet disposed above the path of travel of the coated shingles, means for automatically opening said outlet when the coated shingles pass therebeneath whereby a surfacing material is deposited on said coated upper surface, a belt moving in an endless path beneath the path of travel of the coated lower surface adapted to contact said coated lower surface, means for continuously depositing a layer of surfacing material upon the surface of said moving belt, means for removing said shingles from said conveying means and means for driving the parts in timed relation.

4. An apparatus for coating and slating shingles comprising in combination, means for conveying shingles forwardly in seriatim with their surfaces disposed in a horizontal plane and their longitudinal edges parallel to the movement of said conveying means, means for applying fluid coating to a predetermined portion of the upper and lower surfaces and adjacent edges of said shingles, means for applying surfacing material to said coated upper surface comprising a hopper having an outlet disposed above the path of travel of the coated shingles, means for automatically opening said outlet when the coated shingles pass therebeneath whereby a surfacing material is deposited on said coated upper surface, a belt moving in an endless path beneath the path of travel of the coated lower surface adapted to contact said coated lower surface, means for continuously depositing a layer of surfacing material upon the surface of said moving belt, means for embedding said surfacing material in said coating comprising a pair of opposed rolls between which the coated portions of the shingles and supporting belt pass, means for moving said shingles from said conveying means and means for driving the parts in timed relation.

5. In combination, an endless conveyor for conveying shingles forwardly in seriatim with their surfaces in a horizontal plane and their longitudinal edges parallel to the path of travel of said conveyor, means for applying fluid coating to the upper and lower surfaces and adjacent edges of said shingles, means for applying surfacing material to said coated portions, means for automatically removing said shingles from said conveyor comprising opposed rolls the axes of which are disposed at substantially right angles to the direction of travel of said shingles and above and below a portion of said shingles, means for rotating one of said rolls and means for drawing said rolls together to positively grip each of the shingles therebetween to remove it from the conveyor, and means for driving the parts in timed relation.

6. In combination, an endless conveyor for conveying shingles forwardly in seriatim with their surfaces in a horizontal plane and their longitudinal edges parallel to the path of travel of said conveyor, means for applying fluid coating to the upper and lower surfaces and adjacent edges of said shingles, means for applying surfacing material to said coated portions, means for removing said shingles from said conveyor at substantially right angles thereto, means for upending and for delivering said shingles to a second conveyor with their longitudinal edges transverse to the path of movement of said second conveyor and their surfaces substantially vertical, means for removing said shingles singly from said second conveyor, means for automatically reversing each alternate shingle, means for stacking said shingles in a pile with alternate edges facing in opposite directions, and means for driving the parts in timed relation.

7. An apparatus for coating and slating shingles comprising in combination, means for conveying shingles forwardly in seriatim with their surfaces disposed in a horizontal plane and their longitudinal edges parallel to the movement of said conveying means, means for applying fluid coating to a predetermined portion of the upper and lower surfaces and adjacent edges of said shingles, means for applying surfacing material to said coated upper surface comprising a hopper having an outlet disposed above the path of travel of the coated shingles, means for automatically opening said outlet when the coated shingles pass therebeneath whereby a surfacing material is deposited on said coated upper surface, a belt moving in an endless path beneath the path of travel of the coated lower surface adapted to contact said coated lower surface, means for continuously depositing a layer of surfacing material upon the surface of said moving belt, means for laterally vibrating said belt, means for removing said shingles from said conveying means and means for driving the parts in timed relation.

8. In combination, an endless conveyor for conveying shingles forwardly in seriatim with their surfaces in a horizontal plane and their longitudinal edges parallel to the path of travel of said conveyor, means for applying fluid coating to the upper and lower surfaces and adjacent edges of said shingles, means for applying surfacing material to said coated portions, means for automatically removing said shingles from said conveyor comprising flexible means traveling in an endless path above said conveyor and at an angle thereto, means carried by said flexible means for contacting one edge of the shingle upon the conveyor at a predetermined phase of travel of said flexible means, and displacing said shingle at an angle to said conveyor.

WILLIAM G. DUDLESTON.